United States Patent
Kitabayashi

(10) Patent No.: US 11,763,727 B2
(45) Date of Patent: Sep. 19, 2023

(54) DISPLAY METHOD AND DISPLAY SYSTEM

(71) Applicant: SEIKO EPSON CORPORATION, Tokyo (JP)

(72) Inventor: Kazuyoshi Kitabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/585,327

(22) Filed: Jan. 26, 2022

(65) Prior Publication Data

US 2022/0238060 A1 Jul. 28, 2022

(30) Foreign Application Priority Data

Jan. 27, 2021 (JP) .................. 2021-011077

(51) Int. Cl.
*G09G 3/20* (2006.01)

(52) U.S. Cl.
CPC ... *G09G 3/2092* (2013.01); *G09G 2320/0626* (2013.01); *G09G 2340/12* (2013.01); *G09G 2354/00* (2013.01)

(58) Field of Classification Search
CPC ......... G09G 3/2092; G09G 2320/0626; G09G 2340/12; G09G 2354/00; G06V 10/50; G06V 10/507; G06V 30/18095
See application file for complete search history.

(56) References Cited

U.S. PATENT DOCUMENTS

| | | | |
|---|---|---|---|
| 7,452,084 B2* | 11/2008 | Mochizuki ........... | G03B 21/132 353/121 |
| 8,023,996 B2* | 9/2011 | Camp, Jr. ............ | H04N 9/3173 345/589 |
| 8,807,762 B2* | 8/2014 | Uchiyama ............ | H04N 9/3182 345/589 |
| 9,069,164 B2* | 6/2015 | Starner ................ | G02B 27/017 |
| 2019/0066552 A1* | 2/2019 | Takagi ................. | H04N 9/3185 |
| 2019/0116356 A1 | 4/2019 | Matoba et al. | |

FOREIGN PATENT DOCUMENTS

| | | |
|---|---|---|
| JP | 2004-5513 A | 1/2004 |
| JP | 2005-313291 A | 11/2005 |
| JP | 2014-056044 A | 3/2014 |
| JP | 2014-81924 A | 5/2014 |
| JP | 2017-059931 A | 3/2017 |
| WO | 2017/179272 A1 | 10/2017 |
| WO | 2019/017023 A1 | 1/2019 |

OTHER PUBLICATIONS

Epson, "PowerLite L610U," Projector Throw Distance Simulator, v2.2.3.20210908, Sep. 8, 2021.

* cited by examiner

*Primary Examiner* — Antonio A Caschera
(74) *Attorney, Agent, or Firm* — Oliff PLC

(57) ABSTRACT

The display method includes obtaining a target image showing a target region including a surface, displaying a simulation image on a display, the simulation image being obtained by superimposing a display image on the target image, the display image corresponding to an image to be projected by a projector on the surface, displaying the target image included in the simulation image on the display with a brightness based on first information which specifies a brightness of the target region, and displaying the display image included in the simulation image on the display with a brightness based on second information which specifies a brightness of the display image.

18 Claims, 13 Drawing Sheets

DISPLAY METHOD AND DISPLAY SYSTEM

The present application is based on, and claims priority from JP Application Serial Number 2021-011077, filed Jan. 27, 2021, the disclosure of which is hereby incorporated by reference herein in its entirety.

BACKGROUND

1. Technical Field

The present disclosure relates to a display method and a display system.

2. Related Art

International Publication No. WO 2017/179272 (Document 1) discloses an information processing device which displays a simulation image related to an appearance of a projection image projected from a projector. The simulation image shows an image of a room where the projector is located, and the projection image. The information processing device changes the transmittance of the projection image to thereby simulate the brightness of the projection image.

The visibility of the projection image is not decided only by the brightness of the projection image in some cases. Therefore, it is difficult for the user to imagine the actual visibility of the projection image when looking at the simulation image displayed by the information processing device described in Document 1.

SUMMARY

A display method according to an aspect of the present disclosure includes the steps of obtaining a target image showing a target region including a surface, displaying a simulation image on a display, the simulation image being obtained by superimposing a display image on the target image, the display image corresponding to an image to be projected by a projector on the surface, displaying the target image included in the simulation image on the display with a brightness based on first information configured to designate a brightness of the target region, and displaying the display image included in the simulation image on the display with a brightness based on second information configured to designate a brightness of the display image.

A display system according to another aspect of the present disclosure includes a camera, a display, and at least one processor, wherein the at least one processor executes the steps of obtaining a target image showing a target region including a surface using the camera, making the display display a simulation image, the simulation image being obtained by superimposing a display image on the target image, the display image corresponding to an image to be projected by a projector on the surface, making the display display the target image included in the simulation image with a brightness based on first information configured to designate a brightness of the target region, and making the display display the display image included in the simulation image with a brightness based on second information configured to designate a brightness of the display image.

DESCRIPTION OF AN EXEMPLARY EMBODIMENT

A: First Embodiment

A1: Outline of Information Processing Device 1

Figure 1:
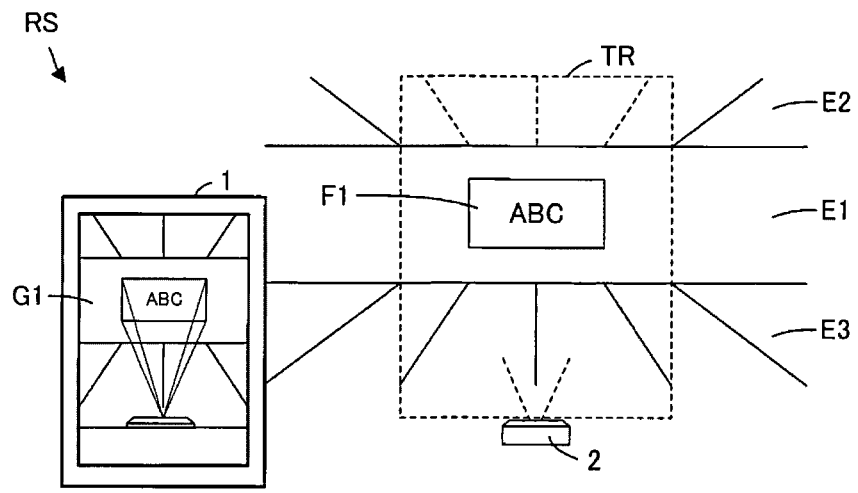
FIG. 1 is a diagram showing an information processing device 1.

FIG. 1 is a diagram showing an information processing device 1. The information processing device 1 is a smartphone. The information processing device 1 is not limited to the smartphone, but can also be, for example, a tablet with a camera, a laptop PC (Personal Computer) with a camera, or a laptop PC to which a camera is coupled. The information processing device 1 is an example of a display system. The information processing device 1 is located in a real space RS.

The real space RS includes a projector 2, a wall E1, a ceiling E2, and a floor E3 in addition to the information processing device 1. The position of the projector 2 in the real space RS is not limited to the position shown in FIG. 1, but can arbitrarily be changed.

The wall E1 is a vertical plane. The wall E1 is not limited to the vertical plane, but is sufficiently a plane crossing a horizontal plane. The wall E1 is an inside wall of a building. The wall E1 is not limited to the inside wall of the building, but can be, for example, an outside wall of the building. At least a part of the wall E1 is an example of a plane. The plane is not limited to at least a part of the wall E1, but can also be, for example, at least a part of the ceiling E2, at least a part of the floor E3, a screen, a whiteboard, or a door. The plane is included in a target region TR.

The target region TR is included in the real space RS. The position of the target region TR in the real space RS is not limited to the position shown in FIG. 1, but can arbitrarily be changed.

The projector 2 projects a projection image F1 on the wall E1 using light. The information processing device 1 displays a first simulation image G1 related to an appearance of the projection image F1.

Figure 2:
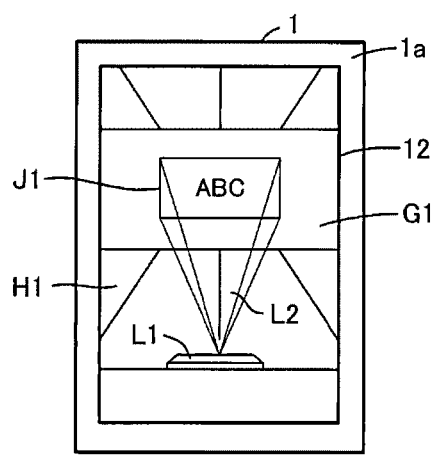
FIG. 2 is a diagram showing a front surface 1a of the information processing device 1.
Figure 3:
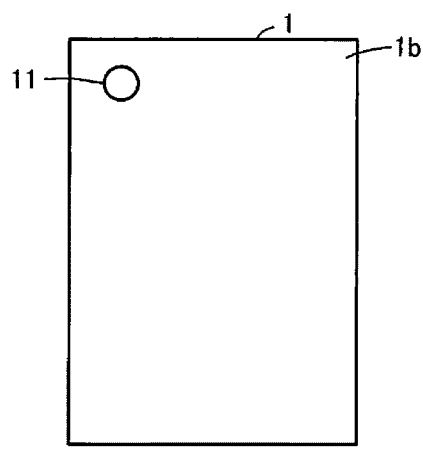
FIG. 3 is a diagram showing a back surface 1b of the information processing device 1.

The information processing device 1 includes a front surface 1a, a back surface 1b, a camera 11, and a touch panel 12. FIG. 2 is a diagram showing the front surface 1a of the information processing device 1. FIG. 3 is a diagram showing the back surface 1b of the information processing device 1.

The camera 11 is located on the back surface 1b of the information processing device 1. The camera 11 takes an image of an imaging region. The imaging region of the camera 11 moves in accordance with a movement of the information processing device 1.

The imaging region of the camera 11 is used as the target region TR. Therefore, the target region TR moves in accordance with a movement of the information processing device 1. The camera 11 takes the image of the target region TR in the state in which the projector 2 does not project the projection image F1 to thereby generate a target image H1 showing the target region TR. The target image H1 showing the target region TR means an image showing an object existing in the target region TR.

Figure 4:
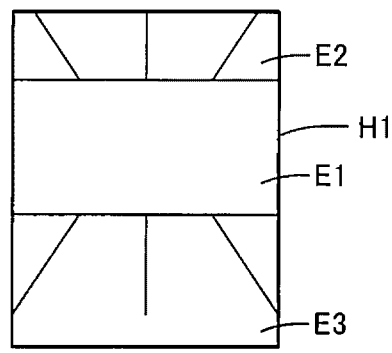
FIG. 4 is a diagram showing an example of a target image H1.

FIG. 4 is a diagram showing an example of the target image H1. The target image H1 shows the wall E1, the ceiling E2, and the floor E3.

As shown in FIG. 2, the touch panel 12 is located on the front surface 1a of the information processing device 1. The touch panel 12 is an example of the display. The touch panel 12 displays the first simulation image G1. The first simulation image G1 is an example of a simulation image.

The first simulation image G1 is an image obtained by superimposing a sample image J1 on the target image H1. The sample image J1 is an example of a display image. An aspect ratio of the sample image J1 is equal to an aspect ratio of the projection image F1. The sample image J1 is an image corresponding to the projection image F1. The sample image J1 shows, for example, the projection image F1. The sample image J1 can be an image different from the projection image F1 such as an image obtained by monochromating the projection image F1. The sample image J1 has predetermined transmittance. The transmittance of the sample image J1 can be variable.

The first simulation image G1 includes a projector image L1. The projector image L1 is an image showing a projector. The shape of the projector shown in the projector image L1 is the same as the shape of the projector 2. The shape of the projector shown in the projector image L1 can be different from the shape of the projector 2. The projector image L1 has predetermined transmittance. The transmittance of the projector image L1 can be variable.

The first simulation image G1 further includes a path image L2. The path image L2 is an image showing a light path used when the projector 2 projects the projection image F1. The path image L2 is also an image showing a light path virtually used when a virtual projector C4 corresponding to the projector 2 projects an image corresponding to the projection image F1. The virtual projector C4 will be described later. The path image L2 has predetermined transmittance. The transmittance of the path image L2 can be variable.

The first simulation image G1 is not required to include at least one of the projector image L1 and the path image L2.

A2: Example of Information Processing Device 1

Figure 5:
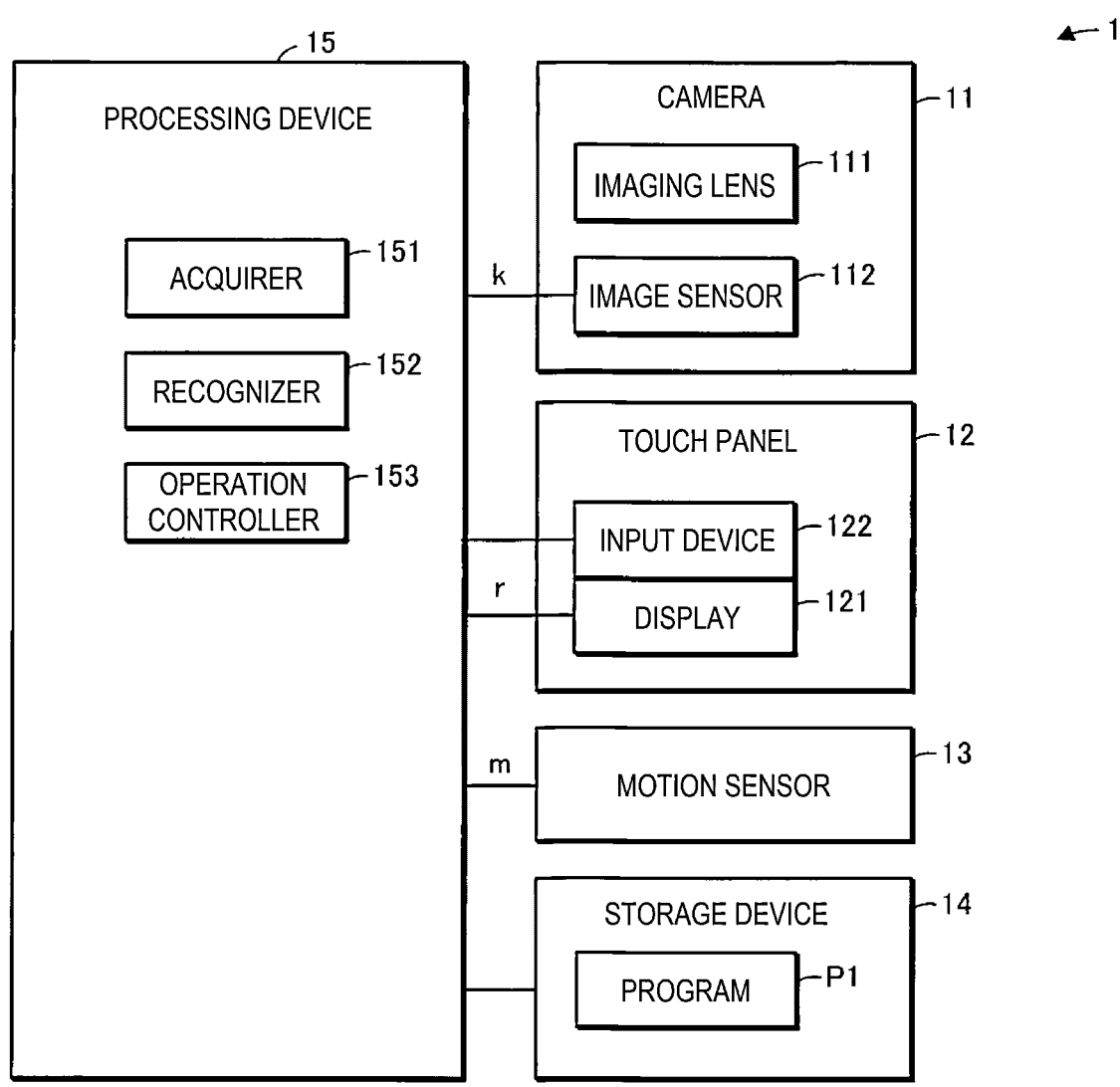
FIG. 5 is a diagram showing an example of the information processing device 1.

FIG. 5 is a diagram showing an example of the information processing device 1. The information processing device 1 includes the camera 11, the touch panel 12, a motion sensor 13, a storage device 14, and a processing device 15.

The camera 11 includes an imaging lens 111 and an image sensor 112.

The imaging lens 111 forms an optical image on the image sensor 112. The imaging lens 111 forms the target image H1 representing the target region TR on the image sensor 112.

The image sensor 112 is a CCD (Charge Coupled Device) image sensor. The image sensor 112 is not limited to the CCD image sensor, but can also be, for example, a CMOS (Complementary Metal Oxide Semiconductor) image sensor. The image sensor 112 generates imaging data k based on the optical image formed on the image sensor 112. For example, the image sensor 112 generates imaging data kt representing the target image H1 based on the target image H1 formed by the imaging lens 111. The imaging data kt is an example of the imaging data k.

The touch panel 12 includes a display 121 and an input device 122. The display 121 displays a variety of images. The input device 122 receives a variety of instructions.

The motion sensor 13 includes an acceleration sensor and a gyro sensor. The motion sensor 13 detects a motion of the information processing device 1. For example, the motion sensor 13 detects the motion of the information processing device 1 moved by the user. The motion of the information processing device 1 is represented by at least a moving distance of the information processing device 1, an amount of rotation of the information processing device 1, and a direction of the information processing device 1. The motion sensor 13 generates motion data m representing the motion of the information processing device 1.

The storage device 14 is a recording medium which can be read by the processing device 15. The storage device 14 includes, for example, a nonvolatile memory and a volatile memory. The nonvolatile memory is one of, for example, a ROM (Read Only Memory), an EPROM (Erasable Programmable Read Only Memory), and an EEPROM (Electrically Erasable Programmable Read Only Memory). The volatile memory is, for example, a RAM (Random Access Memory). The storage device 14 stores a program P1 and a variety of types of data. The program P1 is, for example, an application program. The program P1 is provided to the information processing device 1 from a server not shown. The program P1 can be stored in advance in the storage device 14.

The processing device 15 is formed of a signal CPU (Central Processing Unit) or a plurality of CPUs. The single CPU or the plurality of CPUs is an example of a single processor or a plurality of processors. The processor is an example of a processor set forth in the appended claims. Each of the CPU and the processor is an example of a computer.

The processing device 15 retrieves the program P1 from the storage device 14. The processing device 15 executes the program P1 to thereby function as an acquirer 151, a recognizer 152, and an operation controller 153.

It is possible for the processing device 15 to function as the acquirer 151 and the operation controller 153 by executing the program P1, and function as the recognizer 152 by executing a program different from the program P1. In this case, the program different from the program. P1 is stored in the storage device 14, and the processing device 15 retrieves the program different from the program P1 from the storage device 14.

Each of the acquirer 151, the recognizer 152, and the operation controller 153 can be realized by a circuit such as a DSP (Digital Signal Processor), an ASIC (Application Specific Integrated Circuit), a PLD (Programmable Logic Device), or an FPGA (Field Programmable Gate Array).

The acquirer 151 obtains the target image H1 showing the target region TR. For example, the acquirer 151 obtains the imaging data kt representing the target image H1 from the camera 11 to thereby obtain the target image H1. Further, the acquirer 151 obtains the motion data m from the motion sensor 13.

The recognizer 152 obtains the imaging data kt and the motion data m from the acquirer 151. The recognizer 152 executes three-dimensional measurement with respect to an object existing in the target region TR based on the imaging data kt and the motion data m.

The recognizer 152 executes the three-dimensional measurement in the following manner in the situation in which the information processing device 1 is moved from a first point to a second point while the camera 11 is imaging the wall E1.

The recognizer 152 obtains motion data ms from the acquirer 151. The motion data ms corresponds to the motion data m which is generated by the motion sensor 13 in the situation in which the information processing device 1 is moved from the first point to the second point while the camera 11 is imaging the wall E1. The recognizer 152 decides the distance from the first point to the second point as a base line length based on the motion data ms. The base line length is also referred to as a length of a base line.

The recognizer 152 obtains first imaging data k1 and second imaging data k2 from the acquirer 151. The first imaging data k1 corresponds to the imaging data kt which is generated by the camera 11 when the information processing device 1 is located at the first point. The second imaging data k2 corresponds to the imaging data kt which is generated by the camera 11 when the information processing device 1 is located at the second point. Each of the first imaging data k1 and the second imaging data k2 represents at least the wall E1.

The recognizer 152 executes triangulation using the base line length, the first imaging data k1, and the second imaging data k2 to thereby execute the three-dimensional measurement.

The result of the three-dimensional measurement expresses the shape of the object existing in the target region TR using three-dimensional coordinates. The position of the camera 11 in the real space RS is used as a reference position of the three-dimensional measurement. The recognizer 152 recognizes the wall E1 based on the result of the three-dimensional measurement. For example, the recognizer 152 recognizes a vertical plane as the wall E1 based on the result of the three-dimensional measurement. The recognizer 152 decides a distance n from the information processing device 1 to the wall E1 based on the result of the three-dimensional measurement.

The operation controller 153 controls an operation of the information processing device 1. The operation controller 153 provides image data r representing an image to the touch panel 12 to thereby make the touch panel 12 display the image represented by the image data r.

The operation controller 153 makes the touch panel 12 display the first simulation image G1. The operation controller 153 generates simulation image data r1 based on the result of the three-dimensional measurement and the imaging data kt. The simulation image data r1 is an example of the image data r. The simulation image data r1 represents the first simulation image G1.

For example, the operation controller 153 decides a size q of the sample image J1 based on the distance n decided from the result of the three-dimensional measurement. The distance n is a distance from the information processing device 1 to the wall E1. The size q of the sample image J1 represents the length in a lateral direction of the sample image J1 and the length in a longitudinal direction of the sample image J1. The operation controller 153 increases the size q in accordance with, for example, an increase in the length n. The operation controller 153 decides a correspondence relationship between the distance n and the size q based on the field angle of the projector 2. The field angle of the projector 2 is described in the program P1. Therefore, the operation controller 153 recognizes the field angle of the projector 2 in advance.

The operation controller 153 decides an image obtained by superimposing the sample image J1 with the size q, and projector image L1, and the path image L2 on the target image H1 as the first simulation image G1.

Figure 6:
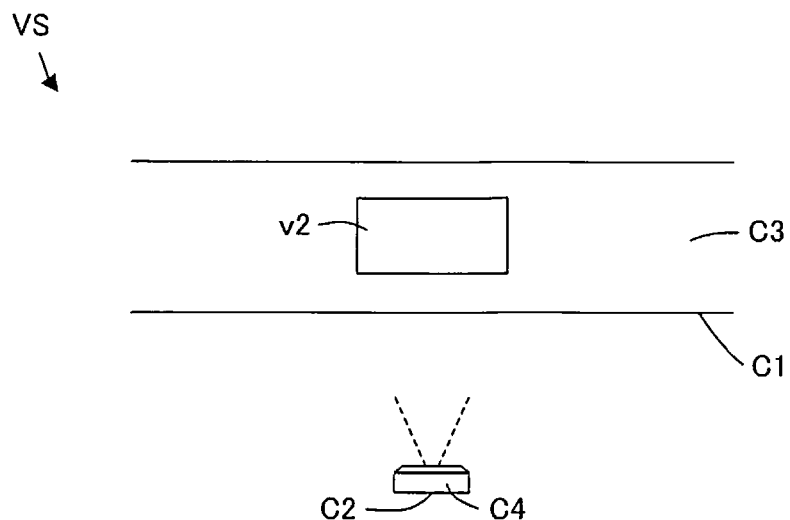
FIG. 6 is a diagram showing an example of a virtual space VS.

The operation controller 153 decides the sample image J1 using the virtual space VS as a three-dimensional space. FIG. 6 is a diagram showing an example of the virtual space VS.

The operation controller 153 uses the virtual space VS to thereby reproduce the arrangement of the object in the real space RS.

The operation controller 153 uses the result of the three-dimensional measurement with respect to the wall E1 to thereby set a first position C1 in the virtual space VS. The first position C1 in the virtual space VS corresponds to a position of the wall E1 in the real space RS.

The operation controller 153 decides a shape of a virtual plane C3 based on the result of the three-dimensional measurement with respect to the wall E1. The virtual plane C3 has substantially the same shape as that of the wall E1. The virtual plane C3 is a plane corresponding to the wall E1. The operation controller 153 disposes the virtual plane C3 at the first position C1.

The operation controller 153 sets a second position C2 in the virtual space VS based on a position of the camera 11 in the real space RS. The second position C2 in the virtual space VS corresponds to a position of the camera 11 in the real space RS. The camera 11 is located in the information processing device 1 together with the touch panel 12. Therefore, the second position C2 in the virtual space VS corresponds to a position of the camera 11 in the real space RS, and at the same time, corresponds to a position of the touch panel 12 in the real space RS.

The operation controller 153 disposes a virtual projector C4 at the second position C2. Therefore, in the virtual space VS, a relative position of the virtual projector C4 to the second position C2 is fixed. In the virtual space VS, the state in which the relative position of the virtual projector C4 to the second position C2 is fixed is not limited to the state in which the virtual projector C4 is located at the second position C2. For example, in the virtual space VS, it is possible for the relative position of the virtual projector C4 to the second position C2 to be fixed in the state in which the virtual projector C4 is located at a position different from the second position C2.

The second position C2 changes in accordance with the change in position of the touch panel 12 in the real space RS. Therefore, in the situation in which the relative position of the virtual projector C4 to the second position C2 is fixed in the virtual space VS, when the position of the touch panel 12 in the real space RS changes, the position of the virtual projector C4 changes in the virtual space VS.

The virtual projector C4 is a projector corresponding to the projector 2. Specifications of the virtual projector C4 are substantially the same as specifications of the projector 2. The specifications of the projector 2 are described in the program P1. Therefore, the operation controller 153 recognizes the specifications of the projector 2 in advance.

The operation controller 153 makes the orientation of the optical axis of a projection lens of the virtual projector C4 with respect to the virtual plane C3 coincide with the orientation of the optical axis of the imaging lens 111 with respect to the wall E1. It should be noted that the operation controller 153 decides the orientation of the optical axis of the imaging lens 111 with respect to the wall E1 based on the recognition result of the wall E1 and the motion data m.

The operation controller 153 disposes a screen image v2 on the virtual plane C3. The screen image v2 is an image obtained by viewing an image, which is displayed on the virtual plane C3 in the situation in which the virtual projector C4 projects the image on the virtual plane C3, from the second position C2. The screen image v2 is another example of the display image. The screen image v2 is an image showing a region in which the sample image J1 is displayed. The screen image v2 functions as a screen of the sample image J1. A size of the screen image v2 is equal to the size q of the sample image J1. The operation controller 153 decides the size of the screen image v2 using a method substantially the same as the method of deciding the size q of the sample image J1. The screen image v2 is an image corresponding to the projection image F1.

The position of the screen image v2 in the virtual plane C3 is fixed in accordance with an instruction from the user. Until the instruction is obtained from the user, the operation controller 153 decides the position of the screen image v2 in the virtual plane C3 based on a position of an intersection between the virtual plane C3 and the optical axis of the projection lens of the virtual projector C4. For example, the operation controller 153 conforms a central position of the screen image v2 in the virtual plane C3 to the position of the intersection between the virtual plane C3 and the optical axis of the projection lens of the virtual projector C4. The central position of the screen image v2 is, for example, a position of an intersection of diagonal lines in the screen image v2.

The operation controller 153 changes the screen image v2 to the sample image J1 to thereby decide the first simulation image G1.

The sample image J1 is an image obtained by viewing an image, which is displayed on the virtual plane C3 in the situation in which the image is projected on the virtual plane C3 from the virtual projector C4 the relative position to the second position C2 of which is fixed, from the second position C2.

In the situation in which the relative position of the virtual projector C4 to the second position C2 is fixed in the virtual space VS, when the position of the touch panel 12 in the real space RS changes, a position of a viewpoint from which the image displayed on the virtual plane C3 is viewed changes in addition to the position of the virtual projector C4 in the virtual space VS.

The operation controller 153 generates the simulation image data r1 representing the first simulation image G1.

The operation controller 153 provides the touch panel 12 with the simulation image data r1 to thereby make the touch panel 12 display the first simulation image G1.

The operation controller 153 makes the touch panel 12 display the target image H1 included in the first simulation image G1 and the projector image L1 included in the first simulation image G1 with the brightness based on first information designating the brightness of the target region TR. For example, the operation controller 153 changes the brightness of the target image H1 included in the first simulation image G1 and the brightness of the projector image L1 included in the first simulation image G1 to the brightness based on the first information. It should be noted that the brightness of the projector image L1 can be constant.

The operation controller 153 makes the touch panel 12 display the sample image J1 included in the first simulation image G1 and the path image L2 included in the first simulation image G1 with the brightness based on second information designating the brightness of the sample image J1. For example, the operation controller 153 changes the brightness of the sample image J1 included in the first simulation image G1 and the brightness of the path image L2 included in the first simulation image G1 to the brightness based on the second information. The second information also corresponds to information of designating the brightness of the light used when the virtual projector C4 projects the image. It should be noted that the brightness of the path image L2 can be constant.

The first information is input to the touch panel 12 by, for example, the user. The second information is input to the touch panel 12 by, for example, the user. The operation controller 153 can generate the second information based on the first information input to the touch panel 12. The operation controller 153 can generate the first information based on the second information input to the touch panel 12.

A3: Recognition of Wall E1

Figure 7:
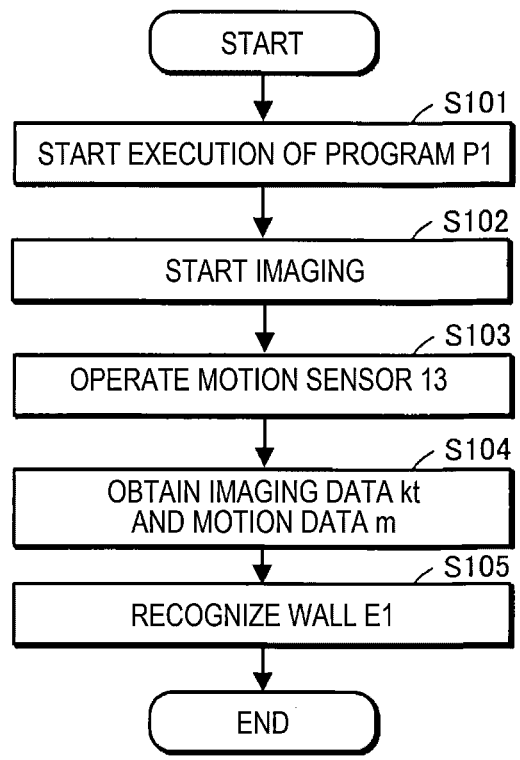
FIG. 7 is a flowchart for explaining recognition of a wall E1.

FIG. 7 is a flowchart for explaining an operation of recognizing the wall E1.

When the touch panel 12 has received a start-up instruction from the user, the processing device 15 starts execution of the program P1 as an application program in the step S101.

Subsequently, in the step S102, the operation controller 153 makes the camera 11 start imaging of the target region TR. The camera 11 images the target region TR to thereby generate the imaging data kt.

Subsequently, in the step S103, the operation controller 153 makes the motion sensor 13 operate. The motion sensor 13 generates the motion data m.

Subsequently, in the step S104, the acquirer 151 starts acquisition of the imaging data kt and the motion data m.

Subsequently, in the step S105, the operation controller 153 makes the recognizer 152 recognize the wall E1.

In the step S105, the recognizer 152 executes the three-dimensional measurement with respect to the object existing in the target region TR based on the imaging data kt and the motion data m obtained by the acquirer 151 in a scanning situation.

The scanning situation means the situation in which the information processing device 1 is moved from the first point to the second point while the camera 11 is imaging the wall E1. The first point is, for example, a position of the information processing device 1 at the starting point of the scanning situation. The second point is, for example, a position of the information processing device 1 at the ending point of the scanning situation. The imaging data kt obtained by the acquirer 151 in the scanning situation corresponds to the first imaging data k1 and the second imaging data k2. The first imaging data k1 corresponds to the imaging data kt which is generated by the camera 11 when the information processing device 1 is located at the first point. The second imaging data k2 corresponds to the imaging data kt which is generated by the camera 11 when the information processing device 1 is located at the second point. The motion data m obtained by the acquirer 151 in the scanning situation corresponds to the motion data ms. The motion data ms corresponds to the motion data m which is generated by the motion sensor 13 in the situation in which the information processing device 1 is moved from the first point to the second point while the camera 11 is imaging the wall E1.

The recognizer 152 decides the distance from the first point to the second point as the base line length based on the motion data ms. The recognizer 152 executes the triangulation using the base line length, the first imaging data k1, and the second imaging data k2 to thereby execute the three-dimensional measurement.

Subsequently, the recognizer 152 recognizes the wall E1 based on the result of the three-dimensional measurement. For example, the recognizer 152 recognizes the vertical plane as the wall E1 based on the result of the three-dimensional measurement.

A4: Display of First Simulation Image G1

Figure 8:
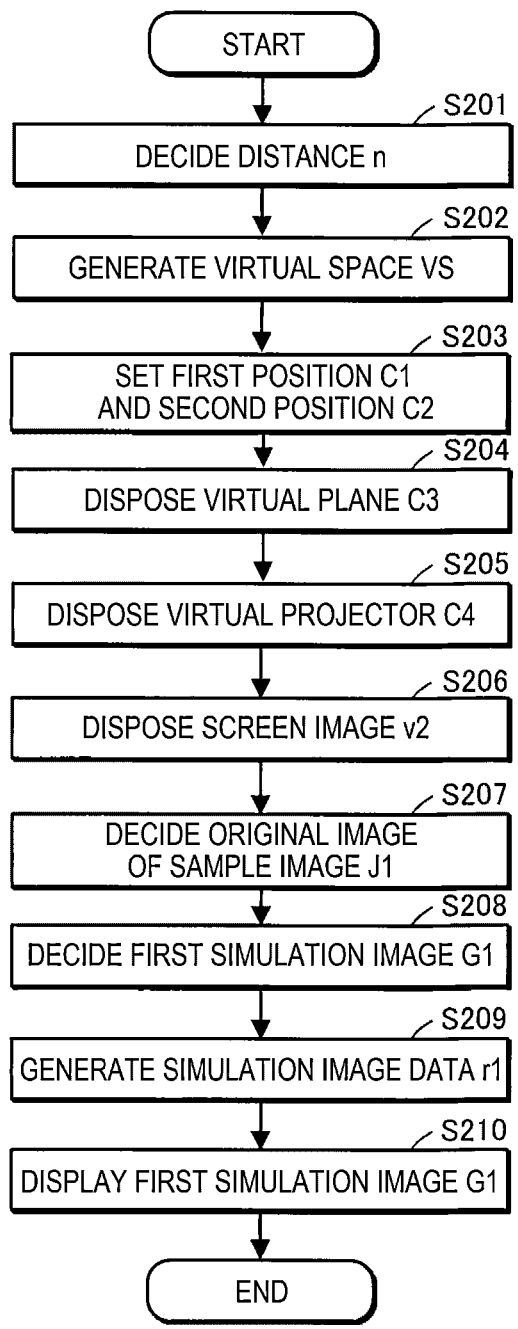
FIG. 8 is a flowchart for explaining display of a first simulation image G1.

FIG. 8 is a flowchart for explaining an operation of displaying the first simulation image G1. The operation shown in FIG. 8 is executed in the situation in which the wall E1 is recognized.

In the step S201, the operation controller 153 makes the recognizer 152 decide the distance n from the information processing device 1 to the wall E1.

In the step S201, the recognizer 152 first obtains the motion data m from the acquirer 151. Subsequently, the recognizer 152 decides the position of the information processing device 1 in the real space RS, namely the position of the camera 11 in the real space RS, based on the motion data m. Subsequently, the recognizer 152 decides the distance n from the information processing device 1 to the wall E1 based on the result of the three-dimensional measurement and the position of the information processing device 1 in the real space RS.

Subsequently, in the step S202, the operation controller 153 generates the virtual space VS.

Subsequently, in the step S203, the operation controller 153 sets the first position C1 and the second position C2 in the virtual space VS.

In the step S203, the operation controller 153 first uses the result of the three-dimensional measurement with respect to the wall E1 to thereby set the first position C1 in the virtual space VS. The first position C1 in the virtual space VS corresponds to a position of the wall E1 in the real space RS. Subsequently, the operation controller 153 uses the position of the camera 11 in the real space RS to thereby set the second position C2 in the virtual space VS. The second position C2 in the virtual space VS corresponds to the position of the camera 11 in the real space RS.

Subsequently, in the step S204, the operation controller 153 disposes the virtual plane C3 in the virtual space VS.

In the step S204, the operation controller 153 first makes the shape of the virtual plane C3 coincide with the shape of the wall E1 of the virtual plane C3 based on the result of the three-dimensional measurement with respect to the wall E1. Subsequently, the operation controller 153 disposes the virtual plane C3 at the first position C1.

Subsequently, in the step S205, the operation controller 153 disposes the virtual projector C4 at the second position C2.

In the step S205, the operation controller 153 disposes the virtual projector C4 at the second position C2 to thereby fix the relative position of the virtual projector C4 to the second position C2. Subsequently, the operation controller 153 decides the orientation of the optical axis of the imaging lens 111 with respect to the wall E1 based on the recognition result of the wall E1 and the motion data m. Subsequently, the operation controller 153 makes the orientation of the optical axis of the projection lens of the virtual projector C4 with respect to the virtual plane C3 coincide with the orientation of the optical axis of the imaging lens 111 with respect to the wall E1.

Subsequently, in the step S206, the operation controller 153 disposes the screen image v2 on the virtual plane C3.

In the step S206, the operation controller 153 conforms the central position of the screen image v2 in the virtual plane C3 to the position of the intersection between the virtual plane C3 and the optical axis of the projection lens of the virtual projector C4. It should be noted that the central position of the screen image v2 in the virtual plane C3 is not limited to the position of the intersection between the virtual plane C3 and the optical axis of the projection lens of the virtual projector C4, but is only required to be a position based on the position of the intersection. Subsequently, the operation controller 153 decides the size of the screen image v2 based on a decision result of the distance n. The operation controller 153 increases the size of the screen image v2 in accordance with an increase in the distance n. The operation controller 153 decides the correspondence relationship between the distance n and the size of the screen image v2 based on the field angle of the projector 2. Subsequently, the operation controller 153 sets a path of the projection light proceeding from the virtual projector C4 toward the screen image v2 in the virtual space VS. Subsequently, when the touch panel 12 has received a position setting instruction from the user, the operation controller 153 fixes the screen image v2 at the position of the screen v2 when the position setting instruction has been received.

Subsequently, in the step S207, the operation controller 153 decides an original image of the sample image J1. In the step S207, the operation controller 153 first decides the image, which is displayed in the screen image v2 in the virtual plane C3 in the situation in which the image is projected on the screen image v2 in the virtual plane C3 from the virtual projector C4 the relative position to the second position C2 of which is fixed, as the original image of the sample image J1. It should be noted that the size of the original image of the sample image J1 is equal to the size of the screen image v2.

Subsequently, in the step S208, the operation controller 153 decides the first simulation image G1.

In the step S208, the operation controller 153 first changes the screen image v2 to the original image of the sample image J1 in the virtual space VS. Subsequently, the operation controller 153 installs a virtual camera having the same characteristics as the characteristics of the camera 11 at the second position C2. The position of the optical axis of the imaging lens of the virtual camera coincides with a position of the optical axis of the projection lens of the virtual projector C4.

Subsequently, the operation controller 153 deletes the virtual plane C3 from the virtual space VS while leaving the original image of the sample image J1, the virtual projector C4, and the path of the projection light from the virtual projector C4 toward the original image of the sample image J1 in the virtual space VS.

Subsequently, the operation controller 153 decides an image, which is obtained when the virtual camera executes the imaging, as the first image.

The first image has a transmissive property. The first image includes an image obtained when viewing the original image of the sample image J1 from the second position C2. In the first image, the image obtained when viewing the original image of the sample image J1 from the second position C2 becomes the sample image J1.

The first image further includes an image showing the virtual projector C4. In the first image, the image showing the virtual projector C4 is an example of the projector image L1.

The first image further includes an image showing the path of the projection light from the virtual projector C4 toward the original image of the sample image J1. In the first image, an image showing the path of the projection light from the virtual projector C4 toward the original image of the sample image J1 is an example of the path image L2.

Subsequently, the operation controller 153 superimposes the first image on the target image H1 to thereby decide the first simulation image G1. It should be noted that the operation controller 153 decides the brightness of the sample image J1 in the first simulation image G1 based on a first default value which designates the brightness of the sample image J1 when starting the display of the sample image J1. The operation controller 153 decides the brightness of the target image H1 in the first simulation image G1 based on a second default value which represents the brightness of the target image H1 when starting the display of the target image H1. The operation controller 153 decides the brightness of the projector image L1 in the first simulation image G1 based on a third default value which represents the brightness of the projector image L1 when starting the display of the projector image L1. The operation controller 153 decides the brightness of the path image L2 in the first simulation image G1 based on a fourth default value which represents the brightness of the path image L2 when starting the display of the path image L2.

Subsequently, in the step S209, the operation controller 153 generates the simulation image data r1 representing the first simulation image G1.

Subsequently, in the step S210, the operation controller 153 provides the touch panel 12 with the simulation image data r1 to thereby make the touch panel 12 display the first simulation image G1.

As described above, in the virtual space VS, when the relative position of the virtual projector C4 to the second position C2 is fixed, the operation controller 153 displays the first simulation image G1 in which the sample image J1 is superimposed on the target image H1 on the touch panel 12. The sample image J1 is an image obtained by viewing an image, which is displayed on the virtual plane C3 in the situation in which the virtual projector C4 the relative position to the second position C2 of which is fixed projects the image on the virtual plane C3, from the second position C2.

A5: Operation of Changing Brightness of First Simulation Image G1

The visibility of the projection image F1 projected from the projector 2 depends on the brightness of the projection image F1 and the brightness of the target region TR. For example, when the target region TR becomes dark in the state in which the brightness of the projection image F1 is kept, the visibility of the projection image F1 increases. The visibility of the projection image F1 is represented as the visibility of the sample image J1 in the first simulation image G1. Therefore, in the first simulation image G1, it is possible to adjust both of the brightness of the sample image J1 and the brightness of the target image H1 so that the visibility of the projection image F1 can be confirmed using the first simulation image G1.

Figure 9:
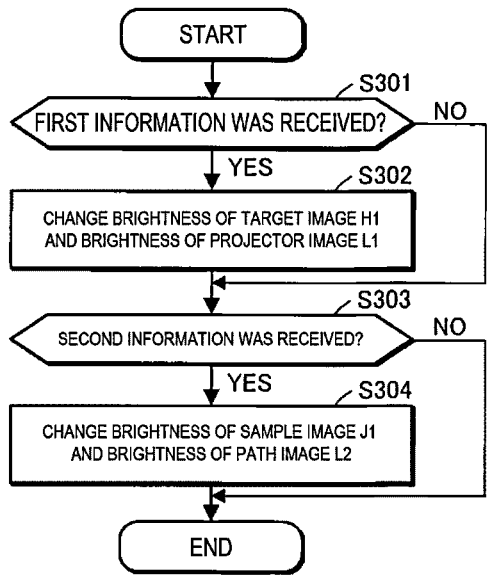
FIG. 9 is a flowchart for explaining an operation of changing the brightness of the first simulation image G1.

FIG. 9 is a flowchart for explaining an operation of changing the brightness of the first simulation image G1. The operation shown in FIG. 9 is repeated in the situation in which the touch panel 12 displays the first simulation image G1.

In the situation in which the touch panel 12 displays the first simulation image G1, the operation controller 153 judges whether or not the touch panel 12 has received the first information from the user in the step S301. In the case of YES in the step S301, namely when the operation controller 153 has judged that the touch panel 12 has received the first information from the user, the operation controller 153 executes the step S302. It should be noted that the first information is information of designating the brightness of the target region TR.

In the step S302, the operation controller 153 changes the brightness of the target image H1 included in the first simulation image G1 and the brightness of the projector image L1 included in the first simulation image G1 to the brightness based on the first information. It should be noted that in the case of NO in the step S301, namely when the operation controller 153 judges that the touch panel 12 has not received the first information from the user, the step S302 is skipped.

Subsequently, in the step S203, the operation controller 153 judges whether or not the touch panel 12 has received the second information from the user. In the case of YES in the step S303, namely when the operation controller 153 has judged that the touch panel 12 has received the second information from the user, the operation controller 153 executes the step S304. It should be noted that the second information is the information of designating the brightness of the light used when the virtual projector C4 projects the image, and furthermore, the information of designating the brightness of the sample image J1.

In the step S304, the operation controller 153 changes the brightness of the sample image J1 included in the first simulation image G1 and the brightness of the path image L2 included in the first simulation image G1 to the brightness based on the second information. It should be noted that in the case of NO in the step S303, namely when the operation controller 153 judges that the touch panel 12 has not received the second information from the user, the step S304 is skipped.

The brightness of each of images included in an image u4 described later can also be changed using substantially the same method as the method of changing the brightness of the first simulation image G1. In this case, the screen image v2 is used instead of the sample image J1.

The brightness of each of images included in an image u5 described later can also be changed using substantially the same method as the method of changing the brightness of the first simulation image G1. In this case, the screen image v2 is used instead of the sample image J1.

A6: Example of Operation

Figure 10:
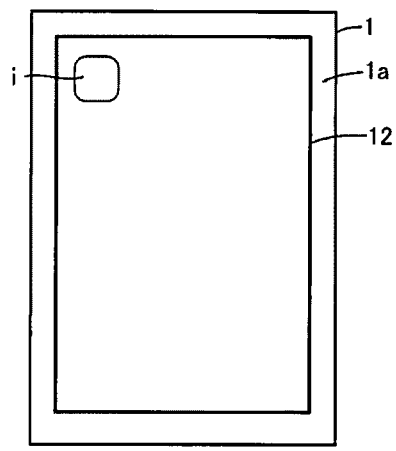
FIG. 10 is a diagram showing an example of an icon i displayed on a touch panel 12.

Then, an example of the operation described above will be descried. In the step S101, the processing device 15 starts the execution of the program P1. The step S101 is executed when the touch panel 12 receives a start-up instruction from the user. The start-up instruction is, for example, is a tap on an icon i representing the program P1 displayed on the touch panel 12. FIG. 10 is a diagram showing an example of the icon i displayed on the touch panel 12.

When the icon i is tapped, the processing device 15 retrieves the program P1 from the storage device 14. Subsequently, the processing device 15 executes the program P1.

The processing device 15 makes the touch panel 12 display a splash screen until the program P1 is executed. When the processing device 15 executes the program P1, the operation controller 153 makes the touch panel 12 display a first guide image t1.

Figure 11:
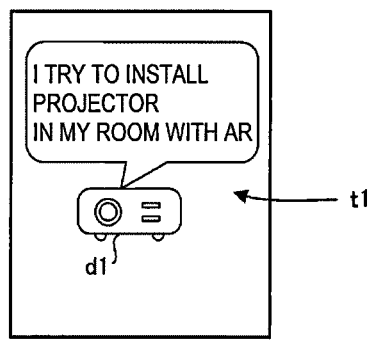
FIG. 11 is a diagram showing an example of a first guide image t1.

FIG. 11 is a diagram showing an example of the first guide image t1. The first guide image t1 shows an outline of a function of the information processing device 1 realized by executing the program P1.

For example, the first guide image t1 shown in FIG. 11 shows a projector d1 which makes a comment "I TRY TO INSTALL PROJECTOR IN MY ROOM WITH AR." AR is an abbreviation of Augmented Reality, and means augmented reality.

The comment shown in the first guide image t1 is not limited to the comment "I TRY TO INSTALL PROJECTOR IN MY ROOM WITH AR" and can arbitrarily be changed. The first guide image t1 is not required to show the projector d1. The first guide image t1 can show an object different from the projector d1 such as an animal instead of the projector d1.

Subsequently, in the step S102, the camera 11 images the target region TR to thereby generate the imaging data kt. Subsequently, in the step S103, the motion sensor 13 generates the motion data m. Subsequently, in the step S104, the acquirer 151 starts the acquisition of the imaging data kt and the motion data m.

Figure 12:
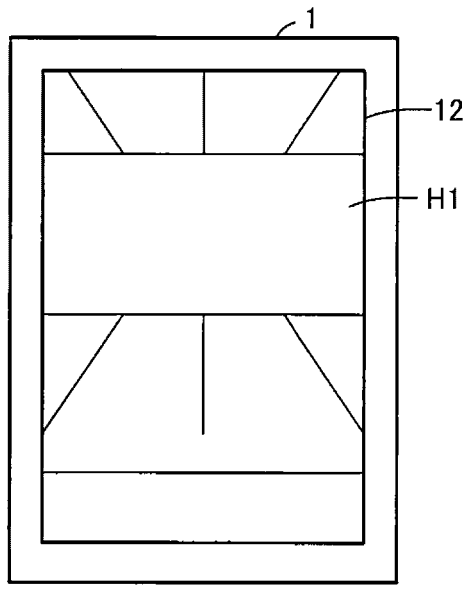
FIG. 12 is a diagram showing an example of the information processing device 1 displaying the target image H1.

After completion of the step S104, it is possible for the operation controller 153 to obtain the imaging data kt from the acquirer 151. In this case, the operation controller 153 provides the touch panel 12 with the imaging data kt as the image data r to thereby make the touch panel 12 display the target image H1. FIG. 12 is a diagram showing an example of the information processing device 1 displaying the target image H1.

Subsequently, in the step S105, the operation controller 153 makes the recognizer 152 recognize the wall E1.

In the step S105, the operation controller 153 first makes the touch panel 12 display an image u1.

Figure 13:
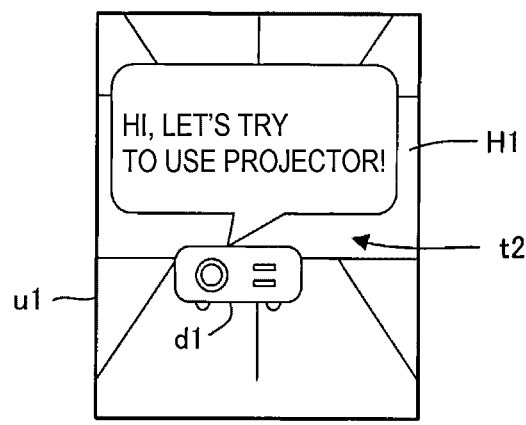
FIG. 13 is a diagram showing an example of an image u1.

FIG. 13 is a diagram showing an example of the image u1. The image u1 is an image obtained by superimposing a second guide image t2 on the target image H1. The second guide image t2 shows the projector d1 making a comment "HI, LET'S TRY TO USE PROJECTOR!"

The comment shown in the second guide image t2 is not limited to the comment "HI, LET'S TRY TO USE PROJECTOR!" but can arbitrarily be changed. The second guide image t2 is not required to show the projector d1. The second guide image t2 can show an object different from the projector d1 such as an animal instead of the projector d1.

Subsequently, the operation controller 153 makes the touch panel 12 display an image u2.

Figure 14:
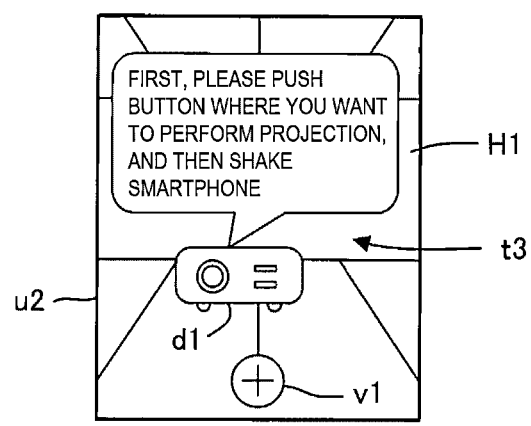
FIG. 14 is a diagram showing an example of an image u2.

FIG. 14 is a diagram showing an example of the image u2. The image u2 is an image obtained by superimposing a third guide image t3 and a button v1 on the target image H1. The third guide image t3 is an image which prompts the user to generate the scanning situation. The scanning situation means the situation in which the information processing device 1 is moved from the first point to the second point while the camera 11 is imaging the wall E1. The button V1 is a button for receiving an input of start of the scanning situation.

The third guide image t3 shows the projector d1 making a comment "FIRST, PLEASE PUSH BUTTON WHERE YOU WANT TO PERFORM PROJECTION, AND THEN SHAKE SMARTPHONE."

The comment shown in the third guide image t3 is not limited to the comment "FIRST, PLEASE PUSH BUTTON WHERE YOU WANT TO PERFORM PROJECTION, AND THEN SHAKE SMARTPHONE," but can arbitrarily be changed as long as the comment prompts the user to generate the scanning situation. The third guide image t3 is not required to show the projector d1. The third guide image t3 can show an object different from the projector d1 such as an animal instead of the projector d1. The configuration of the button v1 is not limited to the configuration shown in FIG. 14, but can arbitrarily be changed.

In accordance with the comment in the third guide image t3, the user pushes the button v1 in the state in which, for example, the wall E1 is displayed on the touch panel 12, and then shakes the information processing device 1.

When the touch panel 12 has detected the tap on the button v1, the operation controller 153 makes the touch panel 12 display an image u3.

Figure 15:
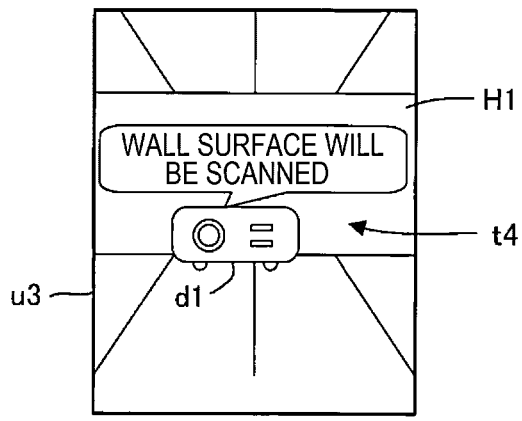
FIG. 15 is a diagram showing an example of an image u3.

FIG. 15 is a diagram showing an example of the image u3. The image u3 is an image obtained by superimposing a fourth guide image t4 on the target image H1. The fourth guide image t4 shows the projector d1 making a comment "WALL SURFACE WILL BE SCANNED."

The comment shown in the fourth guide image t4 is not limited to the comment "WALL SURFACE WILL BE SCANNED," but can arbitrarily be changed. The fourth guide image t4 is not required to show the projector d1. The fourth guide image t4 can show an object different from the projector d1 such as an animal instead of the projector d1.

Figure 16:
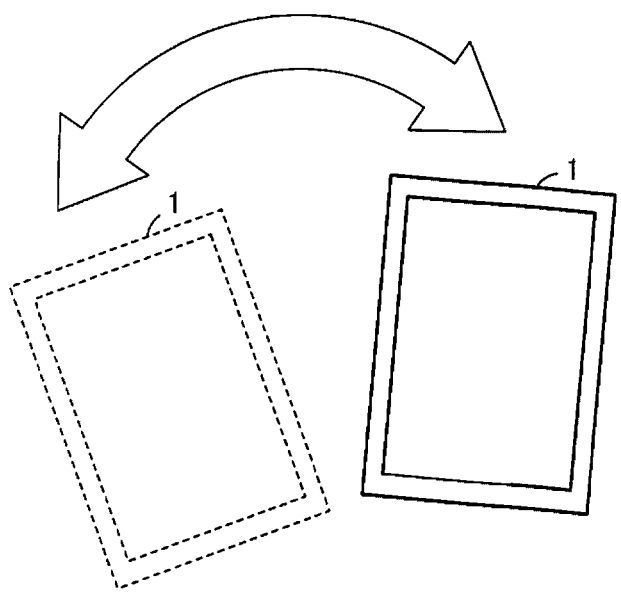
FIG. 16 is a diagram showing a situation in which the information processing device 1 is shaken by the user.

FIG. 16 is a diagram showing a situation in which the information processing device 1 is shaken by the user. When the user shakes the information processing device 1, the scanning situation occurs.

In the scanning situation, the recognizer 152 obtains the first imaging data k1, the second imaging data k2, and the motion data ms.

The recognizer 152 recognizes the wall E1 based on the first imaging data k1, the second imaging data k2, and the motion data ms.

Subsequently, in the step S201, the operation controller 153 makes the recognizer 152 decide the distance n from the information processing device 1 to the wall E1.

Subsequently, in the step S202, the operation controller 153 generates the virtual space VS.

Subsequently, in the step S203, the operation controller 153 sets the first position C1 and the second position C2 in the virtual space VS.

Subsequently, in the step S204, the operation controller 153 disposes the virtual plane C3 in the virtual space VS.

Subsequently, in the step S205, the operation controller 153 disposes the virtual projector C4 in the virtual space VS.

Subsequently, in the step S206, the operation controller 153 disposes the screen image v2 on the virtual plane C3.

In the step S206, the operation controller 153 first conforms the central position of the screen image v2 in the virtual plane C3 to the position of the intersection between the virtual plane C3 and the optical axis of the projection lens of the virtual projector C4.

Subsequently, the operation controller 153 sets the path of the projection light proceeding from the virtual projector C4 toward the screen image v2 in the virtual space VS.

Subsequently, the operation controller 153 installs the virtual camera having the same characteristics as the characteristics of the camera 11 at the second position C2. The position of the optical axis of the imaging lens of the virtual camera coincides with the position of the optical axis of the projection lens of the virtual projector C4.

Subsequently, the operation controller 153 deletes the virtual plane C3 from the virtual space VS while leaving the screen image v2, the virtual projector C4, and the path of the projection light from the virtual projector C4 toward the original image of the sample image J1 in the virtual space VS.

Subsequently, the operation controller 153 decides an image, which is obtained when the virtual camera executes the imaging, as the second image.

The second image has a transmissive property. The second image includes an image obtained when viewing the screen image v2 from the second position C2. In the second image, an image obtained when viewing the screen image v2 from the second position C2 is another example of the display image.

The second image further includes an image showing the virtual projector C4. In the second image, the image showing the virtual projector C4 is another example of the projector image L1.

The second image further includes an image showing the path of the projection light from the virtual projector C4 toward the screen image v2. In the second image, the image showing the path of the projection light from the virtual projector C4 toward the screen image v2 is another example of the path image L2.

Subsequently, the operation controller 153 superimposes the second image and a fifth guide image t5 on the target image H1 to thereby generate the image u4. The image u4 is a second simulation image. Each of the image u4 and the second simulation image is another example of the simulation image. Subsequently, the operation controller 153 makes the touch panel 12 display the image u4.

Figure 17:
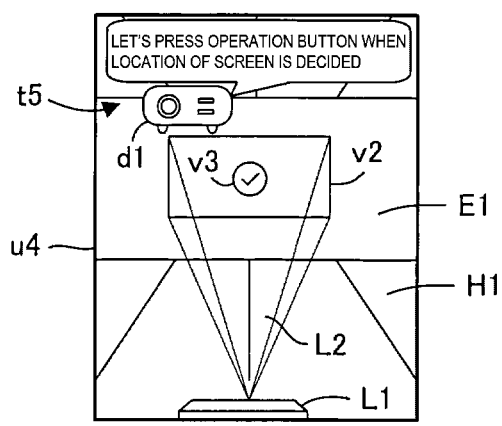
FIG. 17 is a diagram showing an example of an image u4.

FIG. 17 is a diagram showing an example of the image u4. In the image u4, the position of the screen image v2 to the wall E1 changes in accordance with each of a change in position of the touch panel 12 in the real space RS and a change in orientation of the touch panel 12 in the real space RS. The touch panel 12 is installed in the information processing device 1. Therefore, the change in position of the touch panel 12 in the real space RS means a change in position of the information processing device 1 in the real space RS. Further, the change in orientation of the touch panel 12 in the real space RS means a change in orientation of the information processing device 1 in the real space RS. Therefore, it is possible for the user to adjust the position of the screen image v2 with the feeling as if the information processing device 1 were the projector 2 by changing each of the position of the information processing device 1 and the orientation of the information processing device 1.

Further, a portion of the wall E1 shown in the target image H1 is changed in accordance with each of the change in position of the touch panel 12 in the real space RS and the change in orientation of the touch panel 12 in the real space RS.

Therefore, when there occurs either one of the change in position of the touch panel 12 in the real space RS and the change in orientation of the touch panel 12 in the real space RS, a portion of the wall E1 shown in the target image H1 in the image u4 is changed on the one hand, but the position of the projector image L1 in the image u4 is not changed on the other hand. Therefore, it is possible for the user to adjust the position of the screen image v2 on the wall E1 with the feeling as if the projector 2 existed at the position of the information processing device 1 by viewing the image u4 displayed on the touch panel 12.

The screen image v2 includes an operation button v3. The operation button v3 is used for fixing the position of the screen image v2 to the wall E1. Furthermore, the operation button v3 is used for the user to input a position setting instruction.

The configuration of the operation button v3 is not limited to the configuration shown in FIG. 17, but can arbitrarily be changed. The color of the screen image v2 having the operation button v3 is gray. The color of the screen image v2 having the operation button v3 is not limited to gray, but can arbitrarily be changed.

The fifth guide image t5 is an image which prompts the user to perform an operation of fixing the position of the screen image v2 to the wall E1. The fifth guide image t5 shows the projector d1 making a comment "LET'S PRESS OPERATION BUTTON WHEN LOCATION OF SCREEN IS DECIDED."

The comment shown in the fifth guide image t5 is not limited to the comment "LET'S PRESS OPERATION BUTTON WHEN LOCATION OF SCREEN IS DECIDED," but can arbitrarily be changed as long as the comment prompts the user to perform the operation of fixing the position of the screen image v2. The fifth guide image t5 is not required to show the projector d1. The fifth guide image t5 can show an object different from the projector d1 such as an animal instead of the projector d1.

Figure 18:
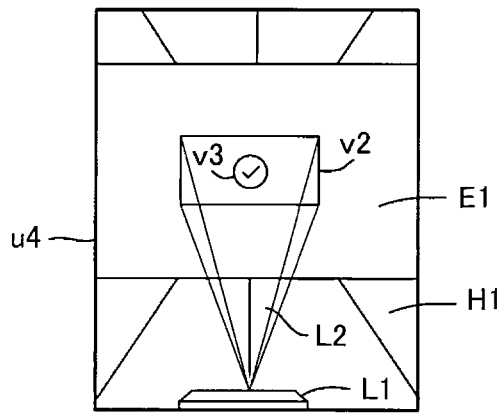
FIG. 18 is a diagram showing another example of the image u4.

The user confirms the image u4 while changing the position of the information processing device 1. FIG. 18 is a diagram showing an example of the image u4 displayed on the information processing device 1 when the position of the information processing device 1 becomes closer to the wall E1 than the position of the information processing device 1 displaying the image u4 shown in FIG. 17. In FIG. 18, the fifth guide image t5 is omitted. The closer to the wall E1 the information processing device 1 is, the lower the ratio of the size of the screen image v2 to the size of the wall E1 becomes. The size of the screen image v2 shown in FIG. 18 is smaller than the size of the screen image v2 shown in FIG. 17. It should be noted that the size of the screen image v2 shown in the image u4 is not required to be changed.

In order to notify the user of a method of decreasing the ratio of the size of the screen image v2 to the size of the wall E1, it is possible for the operation controller 153 to superimpose the image showing the projector making a comment "THE CLOSER YOU GET, THE SMALLER IT BECOMES" on the image u4. The comment "THE CLOSER YOU GET, THE SMALLER IT BECOMES" is an example of a first operation comment representing an operation of decreasing the ratio of the size of the screen image v2 to the size of the wall E1.

The first operation comment is not limited to the comment "THE CLOSER YOU GET, THE SMALLER IT BECOMES," but can arbitrarily be changed. As long as the first operation comment is shown, it is not required to show the projector d1 making the first operation comment. The object making the first operation comment is not limited to the projector d1, but can also be an object different from the projector d1 such as an animal.

Figure 19:
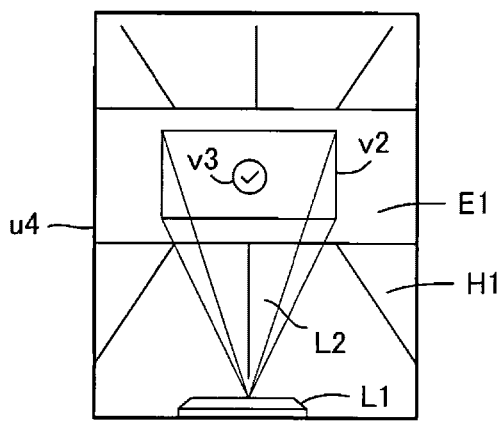
FIG. 19 is a diagram showing still another example of the image u4.

FIG. 19 is a diagram showing an example of the image u4 displayed on the information processing device 1 when the position of the information processing device 1 becomes farther from the wall E1 than the position of the information processing device 1 displaying the image u4 shown in FIG. 17. In FIG. 19, the fifth guide image t5 is omitted. The farther from the wall E1 the information processing device 1 is, the higher the ratio of the size of the screen image v2 to the size of the wall E1 becomes. The size of the screen image v2 shown in FIG. 19 is larger than the size of the screen image v2 shown in FIG. 17. It should be noted that the size of the screen image v2 shown in the image u4 is not required to be changed.

In order to notify the user of a method of increasing the ratio of the size of the screen image v2 to the size of the wall E1, it is possible for the operation controller 153 to superimpose the image showing the projector making a comment "THE FARTHER YOU GET, THE LARGER IT BECOMES" on the image u4. The comment "THE FARTHER YOU GET, THE LARGER IT BECOMES" is an example of a second operation comment representing an operation of increasing the ratio of the size of the screen image v2 to the size of the wall E1.

The second operation comment is not limited to the comment "THE FARTHER YOU GET, THE LARGER IT BECOMES," but can arbitrarily be changed. As long as the second operation comment is shown, it is not required to show the projector d1 making the second operation comment. The object making the second operation comment is not limited to the projector d1, but can also be an object different from the projector d1 such as an animal.

It should be noted that it is possible for the operation controller 153 to change the transmittance of the screen image v2 in the image u4 in accordance with the distance n from the information processing device 1 to the wall E1. For example, the operation controller 153 increases the transmittance of the screen image v2 in the image u4 in accordance with an increase in the distance n. In this case, the visibility of the screen image v2 in the image u4 degrades in accordance with an increase in the distance n. Therefore, it is possible for the operation controller 153 to simulate the phenomenon that the visibility of the projection image F1 in the wall E1 degrades in accordance with an increase in distance from the wall E1 to the projector 2.

Figure 20:
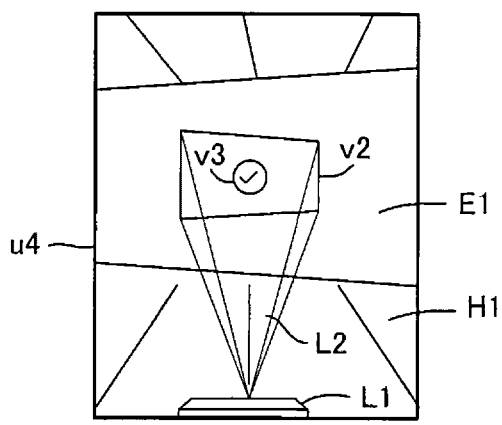
FIG. 20 is a diagram showing still another example of the image u4.
Figure 21:
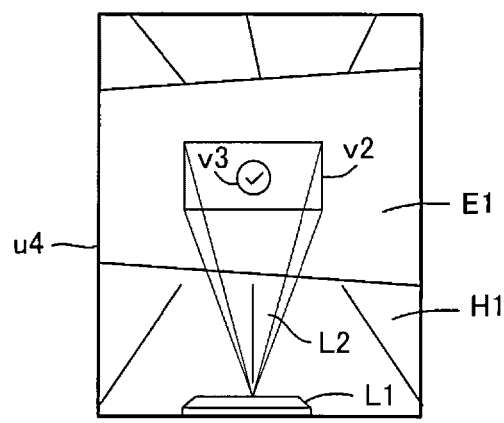
FIG. 21 is a diagram showing still another example of the image u4.

FIG. 20 is a diagram showing an example of the image u4 displayed on the information processing device 1 when the optical axis of the imaging lens 111 is tilted with respect to a normal line of the wall E1. In this case, the screen image v2 has a distortion corresponding to the tilt of the optical axis of the imaging lens 111 with respect to the normal line of the wall E1. The distortion is called a keystone distortion. When the projector 2 has a distortion correction function of correcting the keystone distortion, the operation controller 153 corrects the keystone distortion of the screen image v2 using a distortion correction function equivalent to the distortion correction function provided to the projector 2. FIG. 21 is a diagram showing an example of the image u4 having the screen image v2 in which the keystone distortion shown in FIG. 20 is corrected. In FIG. 20 and FIG. 21, the fifth guide image t5 is omitted.

When the touch panel 12 has detected the tap on the operation button v3, the operation controller 153 fixes the screen image v2 at the position where the screen image v2 is shown when the operation button v3 is tapped.

Subsequently, the operation controller 153 updates the image u4 into the image u5. For example, the operation controller 153 performs deletion of the operation button v3, a change of the color of the screen image v2 from gray to blue, and addition of a sixth guide image t6 on the image u4 to thereby update the image u4 into the image u5. The color which has been changed of the screen image v2 is not limited to blue, but can arbitrarily be chanted.

Figure 22:
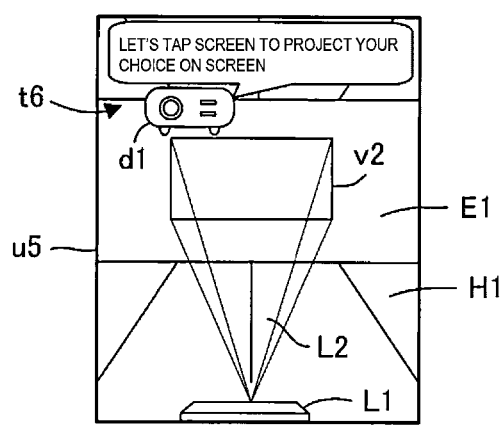
FIG. 22 is a diagram showing an example of an image u5.

FIG. 22 is a diagram showing an example of the image u5. The image u5 is another example of the simulation image. The sixth guide image t6 in the image u5 is an image which prompts the user to decide the image to be displayed in the screen image v2.

In FIG. 22, the sixth guide image t6 shows the projector d1 making a comment "LET'S TAP SCREEN TO PROJECT YOUR CHOICE ON SCREEN."

The comment shown in the sixth guide image t6 is not limited to the comment "LET'S TAP SCREEN TO PROJECT YOUR CHOICE ON SCREEN," but can arbitrarily be changed to an image as long as the image prompts the user to decide the image to be displayed in the screen image v2. The sixth guide image t6 is not required to show the projector d1. The sixth guide image t6 can show an object different from the projector d1 such as an animal instead of the projector d1.

Figure 23:
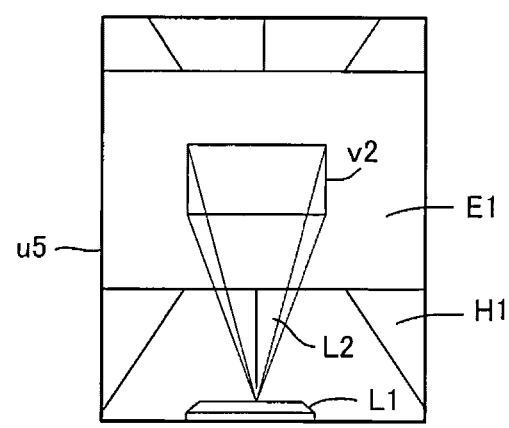
FIG. 23 is a diagram showing another example of the image u5.

It is possible for the user to confirm the screen image v2 thus fixed by looking at the image u5 while moving the information processing device 1. FIG. 23 is a diagram showing an example of the image u5 displayed on the information processing device 1 when the position of the information processing device 1 becomes closer to the wall E1 than the position of the information processing device 1 displaying the image u5 shown in FIG. 22. In FIG. 23, the sixth guide image t6 is omitted. In the situation in which the position of the screen image v2 is fixed, the ratio of the size of the screen image v2 to the size of the wall E1 also decreases in accordance with the decrease in distance between the information processing device 1 and the wall E1. The size of the screen image v2 shown in FIG. 23 is smaller than the size of the screen image v2 shown in FIG. 22. It should be noted that the size of the screen image v2 shown in the image u5 can be constant.

It is possible for the operation controller 153 to superimpose an image showing the projector d1 which makes the first operation comment such as "THE CLOSER YOU GET, THE SMALLER IT BECOMES" on the image u5. As long as the first operation comment is shown, it is not required to show the projector d1 making the first operation comment. The object making the first operation comment is not limited to the projector d1, but can also be an object different from the projector d1 such as an animal.

Figure 24:
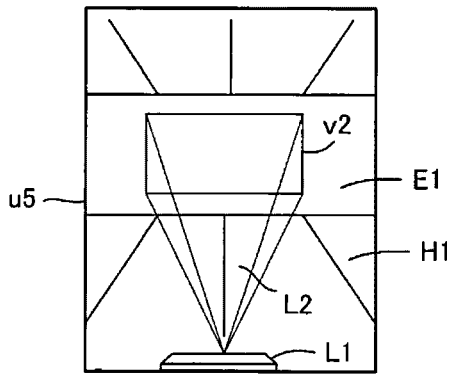
FIG. 24 is a diagram showing still another example of the image u5.

FIG. 24 is a diagram showing an example of the image u5 displayed on the information processing device 1 when the position of the information processing device 1 becomes farther from the wall E1 than the position of the information processing device 1 displaying the image u5 shown in FIG. 22. In FIG. 24, the sixth guide image t6 is omitted. In the situation in which the position of the screen image v2 is fixed, the ratio of the size of the screen image v2 to the size of the wall E1 also increases in accordance with the increase in distance between the information processing device 1 and the wall E1. The size of the screen image v2 shown in FIG. 24 is larger than the size of the screen image v2 shown in FIG. 22. It should be noted that the size of the screen image v2 shown in the image u5 can be constant.

It is possible for the operation controller 153 to superimpose an image showing the projector d1 which makes the second operation comment such as "THE FARTHER YOU GET, THE LARGER IT BECOMES" on the image u5. As long as the second operation comment is shown, it is not required to show the projector d1 making the second operation comment. The object making the second operation comment is not limited to the projector d1, but can also be an object different from the projector d1 such as an animal.

It should be noted that it is possible for the operation controller 153 to change the transmittance of the screen image v2 in the image u5 in accordance with the distance n from the information processing device 1 to the wall E1. For example, the operation controller 153 increases the transmittance of the screen image v2 in the image u5 in accordance with an increase in the distance n.

Figure 25:
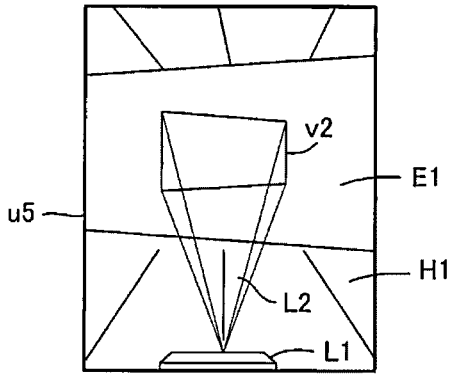
FIG. 25 is a diagram showing still another example of the image u5.
Figure 26:
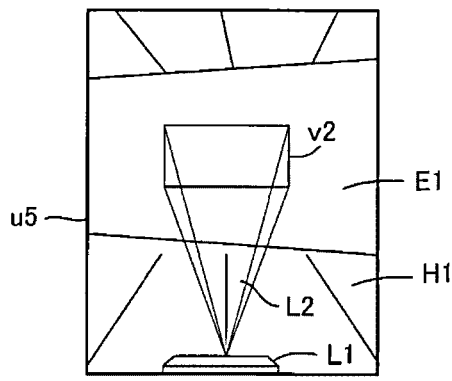
FIG. 26 is a diagram showing still another example of the image u5.

FIG. 25 is a diagram showing an example of the image u5 displayed on the information processing device 1 when the optical axis of the imaging lens 111 is tilted with respect to the normal line of the wall E1. In this case, the screen image v2 has a keystone distortion corresponding to the tilt of the optical axis of the imaging lens 111 with respect to the normal line of the wall E1. When the projector 2 has the distortion correction function of correcting the keystone distortion, the operation controller 153 corrects the keystone distortion of the screen image v2 using the distortion correction function equivalent to the distortion correction function provided to the projector 2. FIG. 26 is a diagram showing an example of the image u5 having the screen image v2 in which the keystone distortion shown in FIG. 25 is corrected. In FIG. 25 and FIG. 26, the sixth guide image t6 is omitted.

It is possible for the user to decide the image to be displayed in the screen image v2 by operating the information processing device 1 in accordance with the sixth guide image t6.

When the touch panel 12 has detected the tap on the screen image v2 in the image u5, the operation controller 153 makes the touch panel 12 display a menu image v4.

Figure 27:
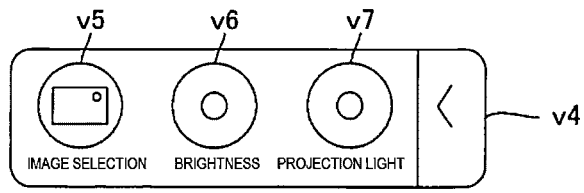
FIG. 27 is a diagram showing an example of a menu image v4.

FIG. 27 is a diagram showing an example of the menu image v4. The menu image v4 includes a selection button v5, a first adjustment button v6, and a second adjustment button v7.

The selection button v5 is used for deciding an image to be displayed in the screen image v2, namely the sample image J1. The first adjustment button v6 is used for adjusting the brightness of the target image H1. The second adjustment button v7 is used for adjusting the brightness of the screen image v2 and the brightness of the sample image J1. Adjusting the brightness of the screen image v2 and adjusting the brightness of the sample image J1 each mean adjusting the brightness of the light emitted by the virtual projector C4.

When the touch panel 12 has detected a tap on the selection button v5, the operation controller 153 makes the touch panel 12 display an image v81.

Figure 28:
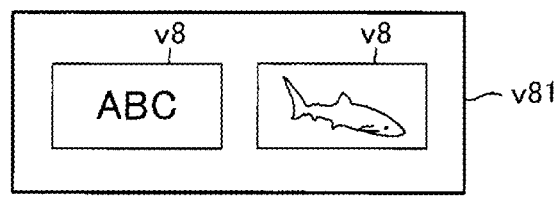
FIG. 28 is a diagram showing an example of image candidates v8.

FIG. 28 is a diagram showing an example of the image v81. The image v81 shows candidates v8 of an image to be displayed in the screen image v2. The candidates v8 of the image are each an image corresponding to the projection image F1 projected from the projector 2. For example, the candidates v8 of the image are each an image showing the projection image F1 projected from the projector 2. The candidate v8 of the image is, for example, a photographic image represented by photographic data. The candidate v8 of the image can be an image of a document represented by document data.

The user taps one of the candidates v8 of the image to be used as the sample image J1. When the tough panel 12 has detected the tap on the candidate v8 of the image, the operation controller 153 decides the candidate v8 of the image thus tapped as the sample image J1.

Subsequently, in the step S207, the operation controller 153 decides an original image of the sample image J1. In the step S207, the operation controller 153 changes the size of the sample image J1 into the size of the screen image v2 to thereby decide the original image of the sample image J1.

Subsequently, in the step S208, the operation controller 153 decides the first simulation image G1.

In the step S208, the operation controller 153 changes the screen image v2 to the original image of the sample image J1 in the virtual space VS. Subsequently, the operation controller 153 installs the virtual camera having the same specifications as the specifications of the camera 11 at the second position C2. The position of the optical axis of the imaging lens of the virtual camera coincides with the position of the optical axis of the projection lens of the virtual projector C4.

Subsequently, the operation controller 153 deletes the virtual plane C3 from the virtual space VS while leaving the original image of the sample image J1, the virtual projector C4, and the path of the projection light from the virtual projector C4 toward the original image of the sample image J1 in the virtual space VS.

Subsequently, the operation controller 153 decides an image, which is obtained when the virtual camera executes the imaging, as the first image.

Subsequently, the operation controller 153 superimposes the first image on the target image H1 to thereby decide the first simulation image G1.

Subsequently, in the step S209, the operation controller 153 generates the simulation image data r1 representing the first simulation image G1.

Subsequently, in the step S210, the operation controller 153 provides the touch panel 12 with the simulation image data r1 to thereby make the touch panel 12 display the first simulation image G1.

In the situation in which the first simulation image G1 is displayed on the touch panel 12, when the touch panel 12 has detected the tap on the sample image J1, the operation controller 153 makes the touch panel 12 display the menu image v4 shown in FIG. 27.

When the touch panel 12 has detected the tap on the first adjustment button v6 in the menu image v4, the operation controller 153 makes the touch panel 12 display an image u6.

Figure 29:
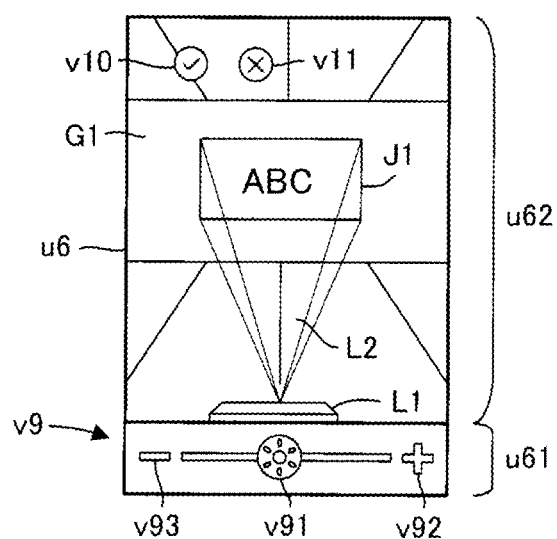
FIG. 29 is a diagram showing an example of an image u6.

FIG. 29 is a diagram showing an example of the image u6. The image u6 includes an image u61 and an image u62. The image u61 is an image showing an operator v9. The image u62 is an image obtained by superimposing a fixation button v10 and a cancel button v11 on the first simulation image G1.

The operator v9 includes an adjustment button v91, a positive mark v92, and a negative mark v93.

The adjustment button v91 can move between the positive mark v92 and the negative mark v93. The movement of the adjustment button v91 is performed by a swipe at the adjustment button v91 by the user. The swipe at the adjustment button v91 by the user is received by the touch panel 12. An end position of the swipe at the adjustment button v91 by the user is an example of the first information for designating the brightness of the target region TR. The operation of the touch panel 12 receiving the swipe at the adjustment button v91 by the user is an example of the step S301.

Subsequently, in the step S302, the operation controller 153 changes the brightness of the target image H1 included in the first simulation image G1 and the brightness of the projector image L1 included in the first simulation image G1 to the brightness based on the swipe at the adjustment button v91.

In the step S302, the operation controller 153 first decides the position of the adjustment button v91 which has been moved based on the swipe received by the touch panel 12. The operation controller 153 adjusts the brightness of the target image H1 and the brightness of the projector image L1 based on the position of the adjustment button v91 having been moved.

The operation controller 153 makes the target image H1 brighter in accordance with a decrease in distance between the position of the adjustment button v91 and the positive mark v92. The operation controller 153 makes the projector image L1 brighter in accordance with the decrease in distance between the position of the adjustment button v91 and the positive mark v92.

The operation controller 153 makes the target image H1 darker in accordance with a decrease in distance between the position of the adjustment button v91 and the negative mark v93. The operation controller 153 makes the projector image L1 darker in accordance with the decrease in distance between the position of the adjustment button v91 and the negative mark v93.

Figure 30:
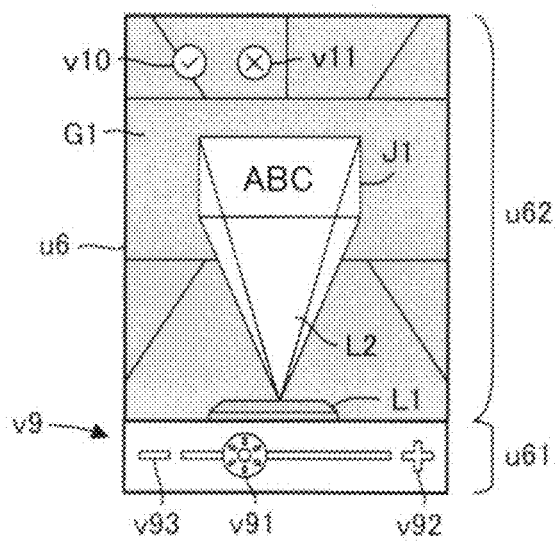
FIG. 30 is a diagram showing another example of the image u6.

FIG. 30 is a diagram showing an example in which the operation controller 153 has made the target image H1 and the projector image L1 darker in accordance with the decrease in distance between the position of the adjustment button v91 and the negative mark v93.

It is possible for the user to adjust the brightness of the target image H1 by performing the swipe at the adjustment button v91.

The fixation button v10 is used for fixing the brightness of the target image H1. When the touch panel 12 has detected the tap on the fixation button v10, the operation controller 153 fixes the brightness of the target image H1 and the brightness of the projector image L1 to the brightness based on the position of the adjustment button v91. Subsequently, the operation controller 153 changes the display on the touch panel 12 from the image u6 to the first simulation image G1.

The cancel button v11 is used for canceling the adjustment of the brightness of the target image H1 due to the movement of the adjustment button v91. When the touch panel 12 has detected the tap on the cancel button v11, the operation controller 153 restores the brightness of the target image H1 and the brightness of the projector image L1 to the brightness before the adjustment button v121 is moved. Subsequently, the operation controller 153 changes the display on the touch panel 12 from the image u6 to the first simulation image G1.

When the touch panel 12 has detected the tap on the second adjustment button v7 in the menu image v4 shown in FIG. 27, the operation controller 153 makes the touch panel 12 display an image u7.

Figure 31:
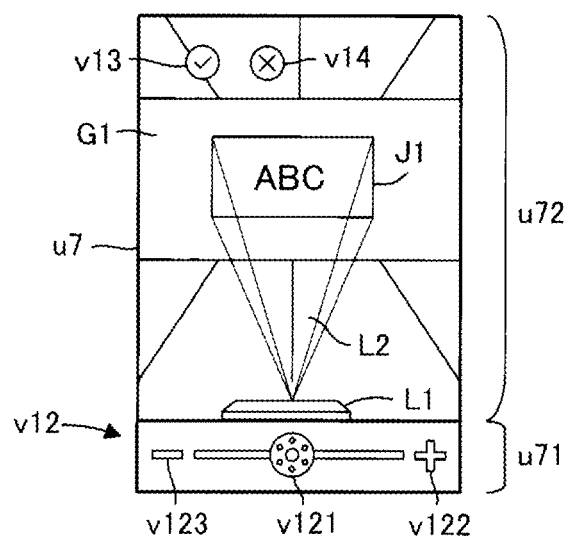
FIG. 31 is a diagram showing an example of an image u7.

FIG. 31 is a diagram showing an example of the image u7. The image u7 includes an image u71 and an image u72. The image u71 is an image showing an operator v12. The image u72 is an image obtained by superimposing a fixation button v13 and a cancel button v14 on the first simulation image G1.

The operator v12 includes an adjustment button v121, a positive mark v122, and a negative mark v123.

The adjustment button v121 can move between the positive mark v122 and the negative mark v123. The movement of the adjustment button v121 is performed by a swipe at the adjustment button v121 by the user. The swipe at the adjustment button v121 by the user is received by the touch panel 12. An end position of the swipe at the adjustment button v121 by the user is an example of the second information for designating the brightness of the sample image J1 and the brightness of the screen image v2. The second information also corresponds to information of designating the brightness of the light used when the virtual projector C4 projects the projection image F1. The operation of the touch panel 12 receiving the swipe at the adjustment button v121 by the user is an example of the step S303.

Subsequently, in the step S304, the operation controller 153 changes the brightness of the sample image J1 included in the first simulation image G1 and the brightness of the path image L2 included in the first simulation image G1 to the brightness based on the swipe at the adjustment button v121.

In the step S304, the operation controller 153 first decides the position of the adjustment button v121 based on the detection result by the touch panel 12.

The operation controller 153 makes the sample image J1 brighter in accordance with a decrease in distance between the position of the adjustment button v121 and the positive mark v122. It is possible for the operation controller 153 to make the path image L2 brighter in accordance with the decrease in distance between the position of the adjustment button v121 and the positive mark v122.

The operation controller 153 makes the sample image J1 darker in accordance with a decrease in distance between the position of the adjustment button v121 and the negative mark v123. It is possible for the operation controller 153 to make the path image L2 darker in accordance with the decrease in distance between the position of the adjustment button v121 and the negative mark v123.

Figure 32:
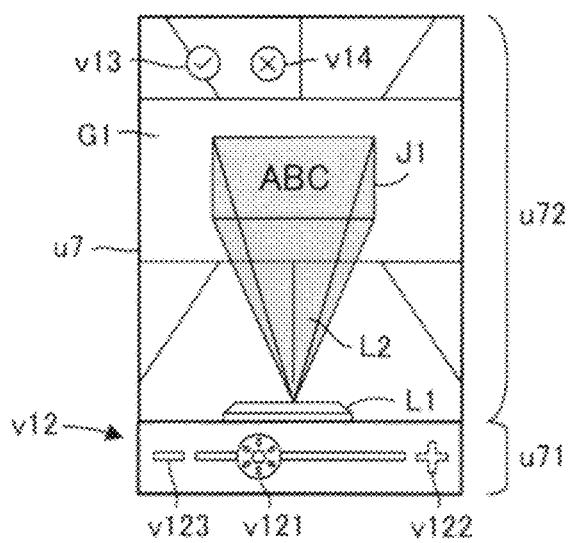
FIG. 32 is a diagram showing another example of the image u7.

FIG. 32 is a diagram showing an example in which the operation controller 153 has made the sample image J1 and the path image L2 darker in accordance with the decrease in distance between the position of the adjustment button v121 and the negative mark v123.

It is possible for the user to adjust the brightness of the sample image J1 and the brightness of the path image L2 by performing the swipe at the adjustment button v121. The position of the adjustment button v121 decided by the swipe at the adjustment button v121 is an example of the second information.

The fixation button v13 is used for fixing the brightness of the sample image J1. When the touch panel 12 has detected the tap on the fixation button v13, the operation controller 153 fixes the brightness of the sample image J1 and the brightness of the path image L2 to the brightness based on the position of the adjustment button v121. Subsequently, the operation controller 153 changes the display on the touch panel 12 from the image u7 to the first simulation image G1.

The cancel button v14 is used for canceling the adjustment of the brightness of the sample image J1 due to the movement of the adjustment button v121. When the touch panel 12 has detected the tap on the cancel button v14, the operation controller 153 restores the brightness of the sample image J1 and the brightness of the path image L2 to the brightness before the adjustment button v121 is moved. Subsequently, the operation controller 153 changes the display on the touch panel 12 from the image u7 to the first simulation image G1.

A7: Conclusion of First Embodiment

The display method and the information processing device 1 according to the first embodiment include the following aspects.

The acquirer 151 obtains the target image H1 showing the target region TR including the wall E1. The operation controller 153 makes the touch panel 12 display the first simulation image G1. The first simulation image G1 is the image obtained by superimposing the sample image J1 corresponding to the projection image F1 to be projected on the wall E1 by the projector 2 on the target image H1. The operation controller 153 makes the touch panel 12 display the target image H1 included in the first simulation image G1 with the brightness based on the first information designating the brightness of the target region TR. The operation controller 153 makes the touch panel 12 display the sample image J1 included in the first simulation image G1 with the brightness based on the second information designating the brightness of the sample image J1. According to this aspect, it is possible to adjust the brightness of the target image H1 and the brightness of the sample image J1 in the first simulation image G1 using the first information and the second information. Therefore, it becomes easy for the user to imagine the actual visibility of the projection image F1 by viewing the first simulation image G1.

The first simulation image G1 includes the projector image L1 as the image showing the projector 2. According to this aspect, it becomes easy for the user to imagine the projector 2 projecting the projection image F1 by viewing the first simulation image G1.

The operation controller 153 makes the touch panel display the projector image L1 included in the first simulation image G1 with the brightness based on the first information. According to this aspect, it becomes easier for the user to imagine the aspect of the projector 2 projecting the projection image F1 by viewing the first simulation image G1.

The first simulation image G1 includes the path image L2 showing the path of the light used by the projector 2 for the projection of the projection image F1. According to this aspect, it becomes easy for the user to imagine the path of the light used by the projector 2 for the projection of the projection image F1 by viewing the first simulation image G1.

The operation controller 153 makes the touch panel 12 display the path image L2 included in the first simulation image G1 with the brightness based on the second information. According to this aspect, it becomes easier for the user to imagine the path of the light used by the projector 2 for the projection of the projection image F1 by viewing the first simulation image G1.

B: Modified Examples

Some aspects of the modifications of the embodiment hereinabove illustrated will hereinafter be illustrated. It is also possible to arbitrarily combine two or more aspects arbitrarily selected from the following illustrations with each other within a range in which the aspects do not conflict with each other.

B1: First Modified Example

In the first embodiment, it is possible for the operation controller 153 to decide the second information based on the first information.

For example, when the target image H1 included in the first simulation image G1 becomes bright due to the first information, the operation controller 153 decides the second information which makes the sample image J1 included in the first simulation image G1 dark. Further, when the target image H1 included in the first simulation image G1 becomes dark due to the first information, the operation controller 153 decides the second information which makes the sample image J1 included in the first simulation image G1 bright. In such a case, it is possible for the operation controller 153 to prevent the contrast between the target image H1 and the sample image J1 from degrading. Therefore, it is possible to prevent the deterioration of the visibility of the sample image J1 due to the degradation of the contrast between the target image H1 and the sample image J1.

According to the first modified example, it is possible for the operation controller 153 to change the brightness of the sample image J1 in accordance with the change in brightness of the target image H1.

Further, in the first embodiment and the first modified example, it is possible for the operation controller 153 to decide the first information based on the second information.

When the sample image J1 included in the first simulation image G1 becomes bright due to the second information, the operation controller 153 decides the first information which makes the target image H1 included in the first simulation image G1 dark. Further, when the sample image J1 included in the first simulation image G1 becomes dark due to the second information, the operation controller 153 decides the first information which makes the target image H1 included in the first simulation image G1 bright. In such a case, it is possible for the operation controller 153 to prevent the contrast between the target image H1 and the sample image J1 from degrading. Therefore, it is possible to prevent the deterioration of the visibility of the sample image J1 due to the degradation of the contrast between the target image H1 and the sample image J1.

In this case, it is possible for the operation controller 153 to change the brightness of the target image H1 in accordance with the change in brightness of the sample image J1.

B2: Second Modified Example

In the first modified example, each of the target image H1 and the sample image J1 can be semi-transparent.

When both of the target image H1 and the sample image J1 are not affected by the first information and the second information, namely when the neither the first information nor the second information is input by the user, the operation controller 153 sets a value of a coefficient w1 for adjusting the brightness of the target image H1 to "0.5." When both of the target image H1 and the sample image J1 are not affected by the first information and the second information, the operation controller 153 sets a value of a coefficient w2 for adjusting the brightness of the sample image J1 to "0.5."

The operation controller 153 multiplies the luminance of each of the pixels of the target image H1 by the coefficient W1 to thereby change the luminance of each of the pixels of the target image H1. The operation controller 153 multiplies the luminance of each of the pixels of the sample image J1 by the coefficient W2 to thereby change the luminance of each of the pixels of the sample image J1.

The operation controller 153 superimposes the sample image J1 in which the luminance of each of the pixels has been changed on the target image H1 in which the luminance of each of the pixels has been changed to thereby prevent the luminance of the portion where the sample image J1 is superimposed on the target image H1 from becoming excessively high even which each of the target image H1 and the sample image J1 is semi-transparent.

When the brightness based on the first information is the brightness which makes the target image H1 bright, the operation controller 153 increases the value of the coefficient w1 and decreases the value of the coefficient w2 so that a total value of the value of the coefficient w1 and the value of the coefficient w2 is kept at "1."

When the brightness based on the first information is the brightness which makes the target image H1 dark, the operation controller 153 decreases the value of the coefficient w1 and increases the value of the coefficient w2 so that the total value of the value of the coefficient w1 and the value of the coefficient w2 is kept at "1."

When the brightness based on the second information is the brightness which makes the sample image J1 bright, the operation controller 153 decreases the value of the coefficient w1 and increases the value of the coefficient w2 so that the total value of the value of the coefficient w1 and the value of the coefficient w2 is kept at "1."

When the brightness based on the second information is the brightness which makes the sample image J1 dark, the operation controller 153 increases the value of the coefficient w1 and decreases the value of the coefficient w2 so that the total value of the value of the coefficient w1 and the value of the coefficient w2 is kept at "1."

It should be noted that the coefficient w1 having been changed corresponds to the first information, and the coefficient w2 having been changed corresponds to the second information.

According to the second modified example, even when each of the target image H1 and the sample image J1 is semi-transparent, it is prevented that the luminance of the portion where the sample image J1 is superimposed on the target image H1 becomes excessively high.

B3: Third Modified Example

In the first embodiment, and the first and second modified examples, it is possible for the operation controller 153 to change the brightness of the path image L2 into the brightness different from the brightness based on the second information when the touch panel 12 receives a change instruction of changing the brightness of the path image L2. The change instruction is a tap on the projector image L1. The change instruction is not limited to the tap on the projector image L1, but can be, for example, a tap on the path image L2.

For example, when the touch panel 12 receives the change instruction, the operation controller 153 makes the brightness of the path image L2 darker than the brightness based on the second information. Making the brightness of the path image L2 darker than the brightness based on the second information includes making the transmittance of the path image L2 higher than the transmittance of the path image L2 having the brightness based on the second information. In this case, it is possible to make the display of the path image L2 inconspicuous. According to the third modified example, it is possible to change the brightness of the path image L2 independently of the brightness of the sample image J1.

B4: Fourth Modified Example

In the first embodiment, and the first through third modified examples, it is possible for the projector 2 to have an optical zoom lens. In this case, it is possible for the operation controller 153 to change the size of the screen image v2 and the size of the sample image J1 within a range based on a zoom characteristic of the optical zoom lens provided to the projector 2.

For example, when the touch panel 12 has received pinch-in in the situation in which the touch panel 12 displays the screen image v2, the operation controller 153 decreases the size of the screen image v2 within the range based on the zoom characteristic of the optical zoom lens.

When the touch panel 12 has received pinch-out in the situation in which the touch panel 12 displays the screen image v2, the operation controller 153 increases the size of the screen image v2 within the range based on the zoom characteristic of the optical zoom lens.

When the touch panel 12 has received pinch-in in the situation in which the touch panel 12 displays the sample image J1, the operation controller 153 decreases the size of the sample image J1 within the range based on the zoom characteristic of the optical zoom lens.

When the touch panel 12 has received pinch-out in the situation in which the touch panel 12 displays the sample image J1, the operation controller 153 increases the size of the sample image J1 within the range based on the zoom characteristic of the optical zoom lens.

When the projector 2 has a digital zoom function, it is possible for the operation controller 153 to change the size of the screen image v2 and the size of the sample image J1 within a range based on a zoom characteristic of the digital zoom function provided to the projector 2. A method of changing the size of the screen image v2 when the projector 2 has the digital zoom function is substantially the same as, for example, the method of changing the size of the screen image v2 when the projector 2 has the optical zoom lens. A method of changing the size of the sample image J1 when the projector 2 has the digital zoom function is substantially the same as, for example, the method of changing the size of the sample image J1 when the projector 2 has the optical zoom lens.

According to the fourth modified example, when the projector 2 has the optical zoom lens or the digital zoom function, it is possible to display the first simulation image G1 corresponding to the zoom function provided to the projector 2.

B5: Fifth Modified Example

In the first embodiment, and the first through fourth modified examples, it is possible for the projector 2 to have a lens shifting function. In this case, it is possible for the operation controller 153 to change the position of the screen image v2 and the position of the sample image J1 within a range based on a shifting characteristic of the lens shifting function provided to the projector 2.

For example, when the touch panel 12 has received a swipe at the screen image v2, the operation controller 153 moves the screen image v2 in accordance with the swipe within a range based on the shifting characteristic of the lens shifting function.

When the touch panel 12 has received a swipe at the sample image J1, the operation controller 153 moves the sample image J1 in accordance with the swipe within a range based on the shifting characteristic of the lens shifting function.

According to the fifth modified example, when the projector 2 has the lens shifting function, it is possible to display the first simulation image G1 corresponding to the lens shifting function provided to the projector 2.

B6: Sixth Modified Example

In the first embodiment, and the first through fifth modified examples, a portion to be displayed on the touch panel out of the screen image v2 can be restricted. For example, the operation controller 153 uses a mask v16 to thereby limit the portion to be displayed on the touch panel 12 out of the screen image v2.

Figure 33:
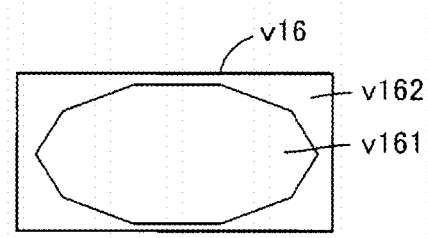
FIG. 33 is a diagram showing an example of a mask v16.

FIG. 33 is a diagram showing an example of the mask v16. The mask v16 includes a transmissive region v161 and a non-transmissive region v162. The transmittance of the transmissive region v161 is 100%. The transmittance of the non-transmissive region v162 is 0%. Each of the shape of the transmissive region v161 and the shape of the non-transmissive region v162 can arbitrarily be changed. The mask v16 is selected by the user.

The operation controller 153 superimposes the mask v16 on the screen image v2 to thereby limit the portion to be displayed on the touch panel 12 out of the screen image v2. In this case, only the portion on which the transmissive region v161 is superimposed is displayed on the touch panel 12 out of the screen image v2.

It is possible for the operation controller 153 to superimpose the mask v16 on the sample image J1 to thereby limit the portion to be displayed on the touch panel 12 out of the sample image J1. In this case, only the portion on which the transmissive region v161 is superimposed is displayed on the touch panel 12 out of the sample image J1.

According to the sixth modified example, it is possible to restrict the portion to be displayed on the touch panel 12 out of the screen image v2, and the portion to be displayed on the touch panel 12 out of the sample image J1. Further, it is possible to set the shape of the portion to be displayed on the touch panel 12 out of the screen image v2, and the shape of the portion to be displayed on the touch panel 12 out of the sample image J1 in accordance with the shape of the non-transmissive region v162.

B7: Seventh Modified Example

In the first embodiment, and the first through sixth modified examples, it is possible for the operation controller 153 to make the touch panel 12 display at least one of the size of the screen image v2 and the size of the sample image J1. Further, in the first embodiment, and the first through sixth modified examples, it is possible for the operation controller 153 to make the touch panel 12 display the distance n from the information processing device 1 to the wall E1.

Figure 34:
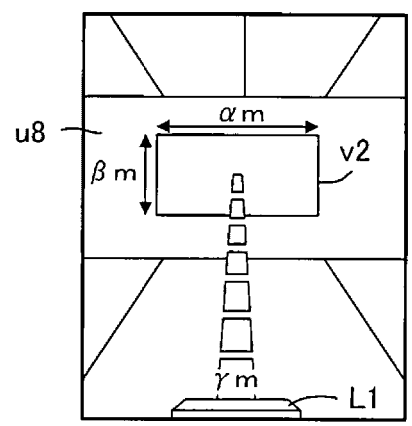
FIG. 34 is a diagram showing an example of an image u8.

FIG. 34 is a diagram showing an example of an image u8 which displays the size of the screen image v2 and the distance n.

In FIG. 34, α m is shown as a length in a horizontal direction of the screen image v2. As a length in a vertical direction of the screen image v2, there is shown β m. As the distance n, there is shown γ m.

It should be noted that the display configuration of the size of the sample image J1 is substantially the same as, for example, the display configuration of the size of the screen image v2. The display configuration of the size of the screen image v2, the display configuration of the distance n, and the display configuration of the sample image J1 are not limited to the display configurations shown in FIG. 34, but can arbitrarily be changed.

According to the seventh modified example, it is possible for the user to confirm at least one of the size of the screen image v2, the size of the sample image J1, and the distance n by viewing the touch panel 12.

B8: Eighth Modified Example

In the first embodiment, and the first through seventh modified examples, it is possible to change the projector 2 as an object of the simulation. In this case, the operation controller 153 generates the first simulation image G1 based on the characteristics of the projector 2 which has been changed, and which is the object of the simulation.

In the first embodiment, and the first through seventh modified examples, it is possible to select the projector 2 as the object of the simulation from a plurality of projectors. In this case, the operation controller 153 generates the first simulation image G1 based on the characteristics of the projector 2 which has been selected, and which is the object of the simulation.

B9: Ninth Modified Example

In the first embodiment, and the first through eighth modified examples, the position of the virtual projector C4 can be fixed to the virtual space VS.

B10: Tenth Modified Example

In the first embodiment, and the first through ninth modified examples, the camera 11, the touch panel 12, and the processing device 15 can be made as separated bodies. In the first embodiment, and the first through ninth modified examples, the camera 11 and the touch panel 12 can be separated from the information processing device 1. In the first embodiment, and the first through ninth modified examples, the camera 11 can be separated from the information processing device 1. In the first embodiment, and the first through ninth modified examples, the touch panel 12 can be separated from the information processing device 1. In the first embodiment, and the first through ninth modified examples, the display 121 and the input device 122 can be separated from each other.

What is claimed is:

1. A display method comprising:
    obtaining a target image showing a target region including a surface and not including a projection image projected by a projector;
    displaying a simulation image on a display panel included in a portable electronic device, the simulation image being obtained by superimposing a display image on the target image, the display image being a virtual image corresponding to the display image to be projected by the projector on the surface;

displaying the target image included in the simulation image on the display panel with a brightness based on first information which specifies a brightness of the target region; and displaying the display image included in the simulation image on the display panel with a brightness based on second information which specifies a brightness of the display image.

2. The display method according to claim 1, further comprising:
receiving the first information; and
determining the second information based on the first information.

3. The display method according to claim 1, further comprising:
receiving the second information; and
determining the first information based on the second information.

4. The display method according to claim 1, wherein
the simulation image includes a projector image showing the projector.

5. The display method according to claim 4, further comprising:
displaying the projector image on the display panel with the brightness based on the first information.

6. The display method according to claim 1, wherein
the simulation image includes a path image showing a path of light used by the projector for projecting the image.

7. The display method according to claim 6, further comprising:
displaying the path image on the display panel with the brightness based on the second information.

8. The display method according to claim 7, further comprising:
changing a brightness of the path image to a brightness different from the brightness based on the second information when receiving a change instruction of changing the brightness of the path image.

9. The display method according to claim 7, further comprising:
making a brightness of the path image darker than the brightness based on the second information when receiving a change instruction of changing the brightness of the path image.

10. A display system comprising:
a camera;
a display panel included in a portable electronic device; and
at least one processor programmed to execute
obtaining a target image showing a target region including a surface using the camera and not including a projection image projected by a projector;
displaying, by controlling the display panel, a simulation image, the simulation image being obtained by superimposing a display image on the target image, the display image being a virtual image corresponding to the display image to be projected by the projector on the surface,
displaying, by controlling the display panel, the target image included in the simulation image with a brightness based on first information which specifies a brightness of the target region, and
displaying, by controlling the display panel, the display image included in the simulation image with a brightness based on second information which specifies a brightness of the display image.

11. A display method comprising:
obtaining a target image showing a target region including a surface;
displaying a simulation image on a display, the simulation image being obtained by superimposing a display image on the target image, the display image corresponding to an image to be projected by a projector on the surface;
displaying the target image included in the simulation image on the display with a brightness based on first information which specifies a brightness of the target region; and
displaying the display image included in the simulation image on the display with a brightness based on second information which specifies a brightness of the display image,
wherein the simulation image includes a path image showing a path of light used by the projector for projecting the image.

12. The display method according to claim 11, further comprising:
receiving the first information; and
determining the second information based on the first information.

13. The display method according to claim 11, further comprising:
receiving the second information; and
determining the first information based on the second information.

14. The display method according to claim 11, wherein
the simulation image includes a projector image showing the projector.

15. The display method according to claim 14, further comprising:
displaying the projector image on the display with the brightness based on the first information.

16. The display method according to claim 11, further comprising:
displaying the path image on the display with the brightness based on the second information.

17. The display method according to claim 16, further comprising:
changing a brightness of the path image to a brightness different from the brightness based on the second information when receiving a change instruction of changing the brightness of the path image.

18. The display method according to claim 16, further comprising:
making a brightness of the path image darker than the brightness based on the second information when receiving a change instruction of changing the brightness of the path image.

* * * * *